(12) United States Patent
Nishimachi

(10) Patent No.: US 11,895,275 B2
(45) Date of Patent: Feb. 6, 2024

(54) IMAGE PROCESSING APPARATUS, IMAGE PROCESSING SYSTEM, AND IMAGE PROCESSING METHOD

(71) Applicant: SHARP KABUSHIKI KAISHA, Sakai (JP)

(72) Inventor: Takashi Nishimachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/110,443

(22) Filed: Feb. 16, 2023

(65) Prior Publication Data
US 2023/0300262 A1 Sep. 21, 2023

(30) Foreign Application Priority Data

Mar. 18, 2022 (JP) ................................ 2022-044372

(51) Int. Cl.
| | |
|---|---|
| G06K 15/00 | (2006.01) |
| G06K 15/02 | (2006.01) |
| H04N 1/00 | (2006.01) |
| H04N 1/327 | (2006.01) |

(52) U.S. Cl.
CPC ....... *H04N 1/00214* (2013.01); *H04N 1/0097* (2013.01); *H04N 1/00233* (2013.01); *H04N 1/00241* (2013.01); *H04N 1/32776* (2013.01)

(58) Field of Classification Search
CPC .......... H04N 1/00214; H04N 1/00233; H04N 1/00241; H04N 1/0097; H04N 1/32776
See application file for complete search history.

(56) References Cited

U.S. PATENT DOCUMENTS

2018/0352110 A1* 12/2018 Shibao ............... H04N 1/00307
2019/0020768 A1* 1/2019 Nishiyama ........... H04N 1/4413

FOREIGN PATENT DOCUMENTS

JP 2007-325168 A 12/2007

\* cited by examiner

*Primary Examiner* — Moustapha Diaby
(74) *Attorney, Agent, or Firm* — ScienBiziP, P.C.

(57) ABSTRACT

An image processing apparatus includes a display capable of accepting designation of a destination of an e-mail, a transmitter/receiver capable of transmitting and receiving the e-mail, a job executor that executes a job via the e-mail, and a controller that acquires destination information of the e-mail to be sent as the job from received information of the received e-mail, and displays the acquired destination information on the display.

8 Claims, 24 Drawing Sheets

FIG. 4

| FORMAT ID | FORMAT | VALUE |
|---|---|---|
| #01 | Scan | — |
| #02 | Pass:[ ] | ***** |
| #03 | Time:[ ] | ***** |
| #04 | CC:[ ] | ****@**** |
| #05 | TO:[ ] | ****@**** |
| #06 | BCC:[ ] | ****@**** |
| #07 | Pass:[ ],Time:[ ],CC:[ ]... | ***, *, **@**** |

FIG. 5A

| E-MAIL ID | RETURN E-MAIL ADDRESS | FORMAT ID | E-MAIL ADDRESS |
|---|---|---|---|
| #1011 | [user1@sample.com] (reply to) [nnnn@sample.com] | #01, #02 #04 | [cccc@xyz.com] |
| #1025 | [user2@sample.com] | #01 #05 | [ffff@xyz.com] [gggg@xyz.com [hhhh@xyz.com] |
| #1020 | [user3@sample.com] | #01 | |
| #1017 | [user4@sample.com] | #01 #07 | [ffff@xyz.com] [cccc@xyz.com [iiii@xyz.com] |

| REGISTRANT ID | REGISTRANT NAME | E-MAIL ADDRESS |
|---|---|---|
| RI01 | yamada taro | yamada@sample.com |
| RI02 | sato jiro | sato_jiro@sample.com |
| RI03 | tanaka ichiro | tanaka_ichiro@sample.com |
| RI04 | kato saburo | kato@sample.com |
| RI05 | ueda shiro | ueda@sample.com |

| REGISTRANT ID | REGISTRANT NAME | E-MAIL ADDRESS |
|---|---|---|
| 001 | ai ueo | cccc@xyz.com |
| 002 | kaki kukeko | dddd@xyz.com |
| 003 | sashi suseso | eeee@xyz.com |
| 004 | nani nuneno | ffff@xyz.com |
| 005 | hahi fuheho | gggg@xyz.com |
| 006 | mami mumemo | hhhh@xyz.com |
| 007 | ya yuyo | iiii@xyz.com |
| 008 | rari rurero | jjjj@xyz.com |
| 009 | wawo n | kkkk@xyz.com |
| 010 | user1 | user1@sample.com |
| 011 | user2 | user2@sample.com |
| 012 | user3 | user3@sample.com |
| 013 | user4 | user4@sample.com |
| ... | ... | ... |

| SUBJECT | Scan |
|---|---|
| BODY | |

02

| SUBJECT | Scan |
|---|---|
| BODY | Pass : [aaaa] |

03

| SUBJECT | Scan |
|---|---|
| BODY | Time : [bbbb] |

04

| SUBJECT | Scan |
|---|---|
| BODY | CC : [cccc@xyz.com]<br>CC : [dddd@xyz.com]<br>CC : [eeee@xyz.com] |

05

| SUBJECT | Scan |
|---|---|
| BODY | TO : [ffff@xyz.com]<br>TO : [gggg@xyz.com]<br>TO : [hhhh@xyz.com] |

06

| SUBJECT | Scan |
|---|---|
| BODY | BCC : [iiii@xyz.com]<br>BCC : [jjjj@xyz.com]<br>BCC : [kkkk@xyz.com] |

07

| SUBJECT | Scan |
|---|---|
| BODY | PASS : [aaaa]<br>TIME : [bbbb]<br>TO : [ffff@xyz.com]<br>CC : [cccc@xyz.com]<br>BCC : [iiii@xyz.com] |

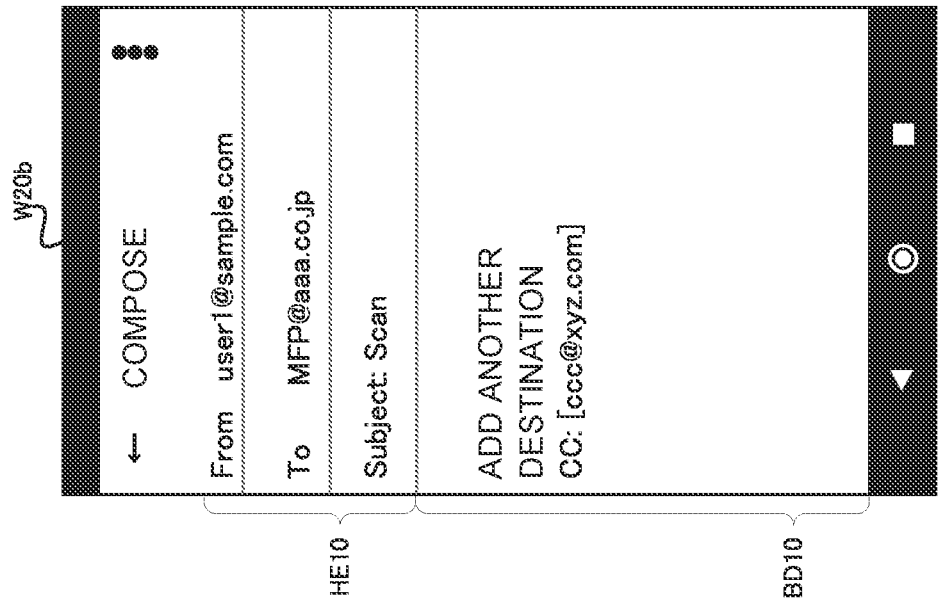
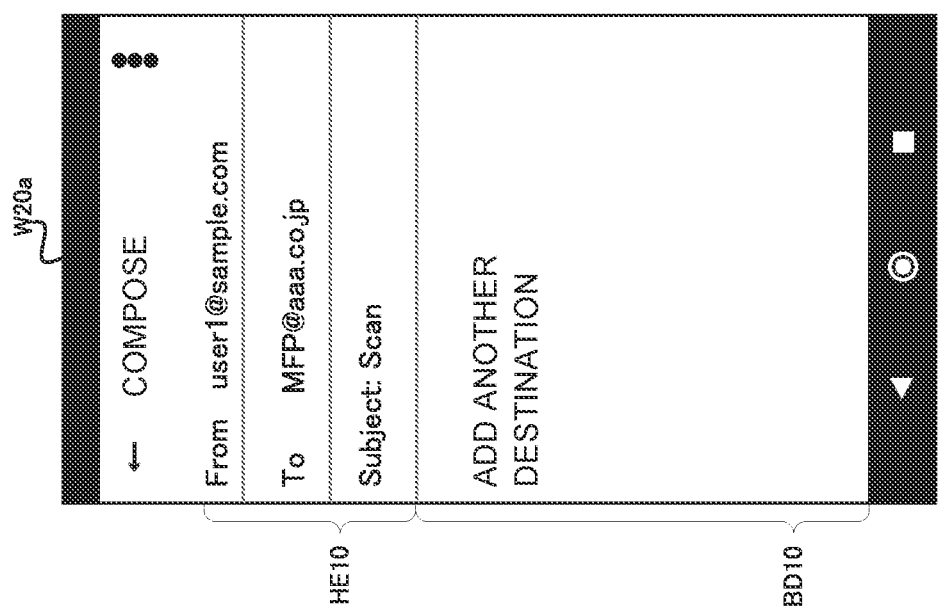

FIG. 24

DO YOU WANT TO REGISTER YOUR E-MAIL ADDRESS? THE REGISTERED E-MAIL ADDRESS WILL BE USED ONLY FOR THE PURPOSE OF IMPROVING OUR SERVICE. WE WILL ISSUE A FREE COUPON TO THOSE WHO HAVE COOPERATED IN THIS PROJECT. PLEASE SELECT YES IF YOU LIKE.

[Yes] [No]

ABOUT OUR COMPANY'S APPROACH.

IMAGE PROCESSING APPARATUS, IMAGE PROCESSING SYSTEM, AND IMAGE PROCESSING METHOD

BACKGROUND OF THE INVENTION

Field of the Invention

The present disclosure relates to an image processing apparatus and the like.

Description of the Background Art

Some image processing apparatuses, such as multifunction peripherals, include a function of converting scanned document data into electronic data such as in the portable document file (PDF) format, and transmits the converted electronic data by attaching it to an e-mail (Scan to E-mail function).

Conventionally, when setting the destination of the e-mail, the user selects a desired e-mail address from the address information managed by the image processing apparatus (hereinafter referred to as "address book") to set the destination. Alternatively, when the address book does not manage the desired e-mail address, the user directly enters the e-mail address with a keyboard or other input method.

On the other hand, in order to set the destination of the e-mail more efficiently, a known method uses a camera or other reading means to read a printout of encoded information in which information about the e-mail address of the destination is encoded.

However, the conventional technology causes wrong transmission due to input errors of the e-mail address or takes time to enter the e-mail address. When setting the destination by reading the encoded information according to the conventional technology, the encoded information needs to be prepared in a format readable by the image processing apparatus, which is time-consuming.

It is an object of the present disclosure to provide an image processing apparatus and the like that can prevent input errors of the e-mail address in setting a destination of the e-mail pertaining to the Scan to E-mail function, while eliminating the hassle of entering the e-mail address.

SUMMARY OF THE INVENTION

In order to solve the above problem, an image processing apparatus according to the present disclosure includes a display capable of accepting designation of a destination of an e-mail, a transmitter/receiver capable of transmitting and receiving the e-mail, a job executor that executes a job via the e-mail, and a controller that acquires the destination information of the e-mail to be sent as the job from received information of the received e-mail, and displays the acquired information on the display.

A processing system according to the present disclosure includes a terminal device that transmits an e-mail including destination information described in a predetermined format, a display capable of accepting designation of a destination of the e-mail, a transmitter/receiver capable of transmitting and receiving the e-mail, a job executor that executes a job via the e-mail, and a controller that acquires the destination information of the e-mail to be sent as the job from the e-mail received from the terminal device, and displays the acquired information on the display.

A processing method according to the present disclosure includes designating by accepting a destination of an e-mail, transmitting/receiving the e-mail, executing a job via the e-mail, and controlling by acquiring destination information of the e-mail to be sent as the job from received information of the received e-mail, and displaying the acquired information on the display.

According to the present disclosure, it is possible to provide image processing apparatus and the like that can prevent input errors of the e-mail address and eliminate the hassles associated with input in setting the destination of electronic data via e-mail pertaining to the Scan to E-mail function.

BRIEF DESCRIPTION OF THE DRAWINGS

FIG. 4 is a view explaining a format information management table;

FIG. 5A is a view explaining a destination information management table; FIG. 5B is a view explaining a registrant information management table managed by the multifunction peripheral;

FIG. 7 is a view explaining a registrant information management table managed by the terminal device;

FIG. 8 is a view explaining a format storage area;

FIGS. 13A and 13B are views explaining operation examples according to the first embodiment;

FIG. 24 is a view explaining an operation example according to a third embodiment.

DESCRIPTION OF THE PREFERRED EMBODIMENTS

Embodiments of the present disclosure will be described below with reference to the accompanying drawings. In the present disclosure, a multifunction peripheral capable of executing jobs related to, for example, copying, faxing, scanning, e-mailing, and the like in a single enclosure is described as a form of the image processing apparatus according to the present disclosure. In particular, the multifunction peripheral described in the present disclosure is an imaging apparatus capable of executing a job pertaining to the Scan to E-mail function by converting scanned data of a document into electronic data such as in the PDF format, and transmitting the converted electronic data by attaching it to the e-mail. As used herein, the term "job" shall mean a job pertaining to the Scan to E-mail function, unless otherwise noted. The embodiments below are examples for describing the present disclosure, and the technical scope of the description in claims is not limited to the following description.

1. First Embodiment

A first embodiment is a form of the multifunction peripheral that acquires destination information of an e-mail to be sent as a job from a received e-mail information and displays the acquired information on a display. As used herein, the received information is the textual information included in the header and the body portion (referred to as the body) of the e-mail. The destination information is information included in the received information of the received e-mail, such as an e-mail address to determine the destination of the e-mail to be sent as a job, or textual information to identify that the received e-mail is related to the Scan to E-mail function. The form of the destination information will be described later.

1.1 Overall Structure

Figure 1:
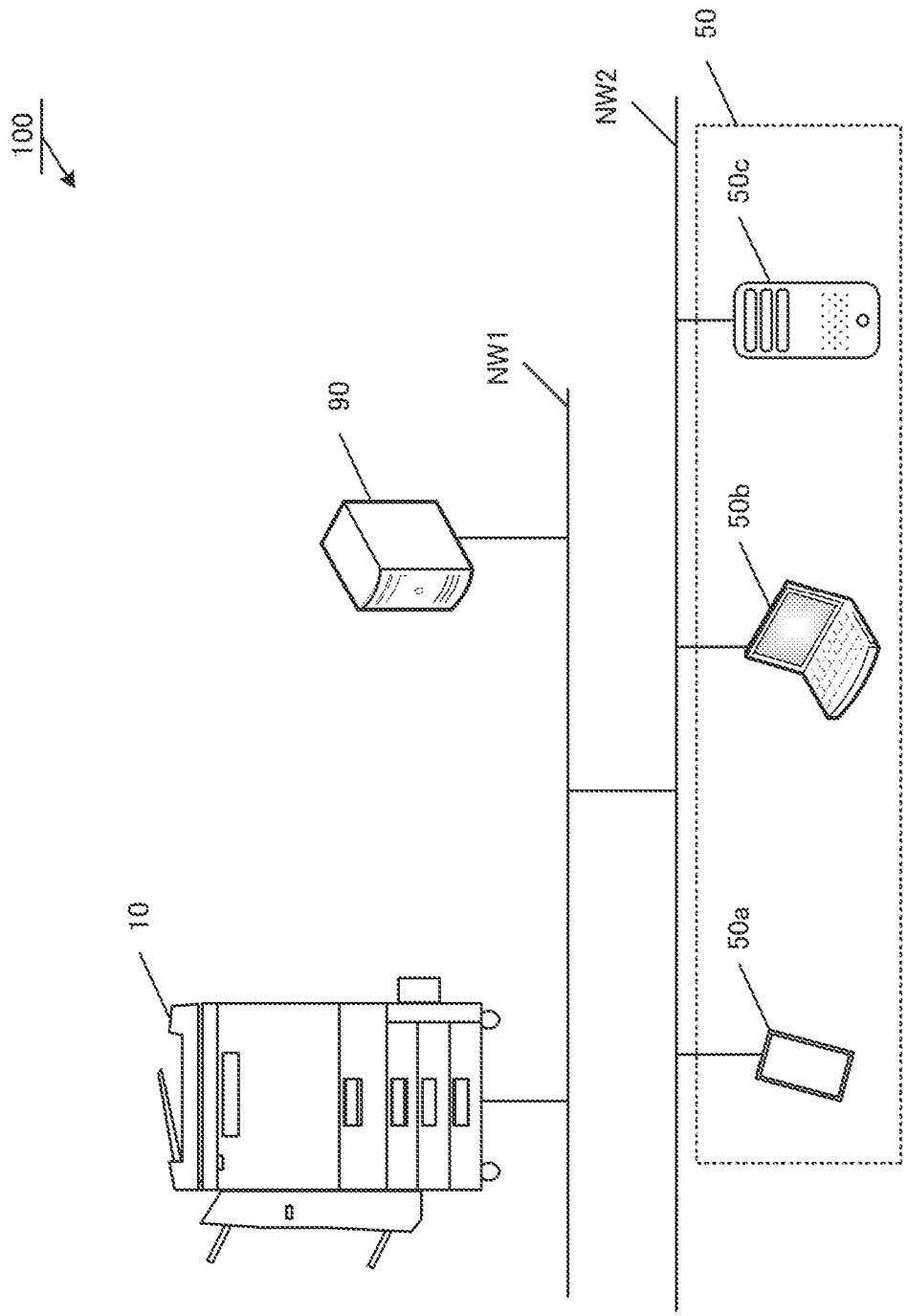
FIG. 1 illustrates an example form of connection between a multifunction peripheral and networks NW according to a first embodiment.

FIG. 1 illustrates an example form of connection between a multifunction peripheral 10 and networks NW. Examples of the networks NW include a local area network (LAN), a wide area network (WAN), the Internet, and the like. In FIG. 1, the multifunction peripheral 10 and an e-mail server 90 are connected to a network NW1, and terminal devices 50a, 50b, and 50c are connected to a network NW2, in which the networks NW1 and NW2 are connected to each other. Alternatively, the networks NW may be connected differently. For example, the multifunction peripheral 10 and the terminal devices 50 (50a to 50b) may be connected to the same network NW, while the e-mail server 90 may be connected to another network NW. Any form of connection between the multifunction peripheral 10 and the networks NW capable of receiving e-mails from the terminal devices 50 (50a to 50c) can be used.

1.2 Functional Structure
1.2.1 Multifunction Peripheral 10

Figure 2:
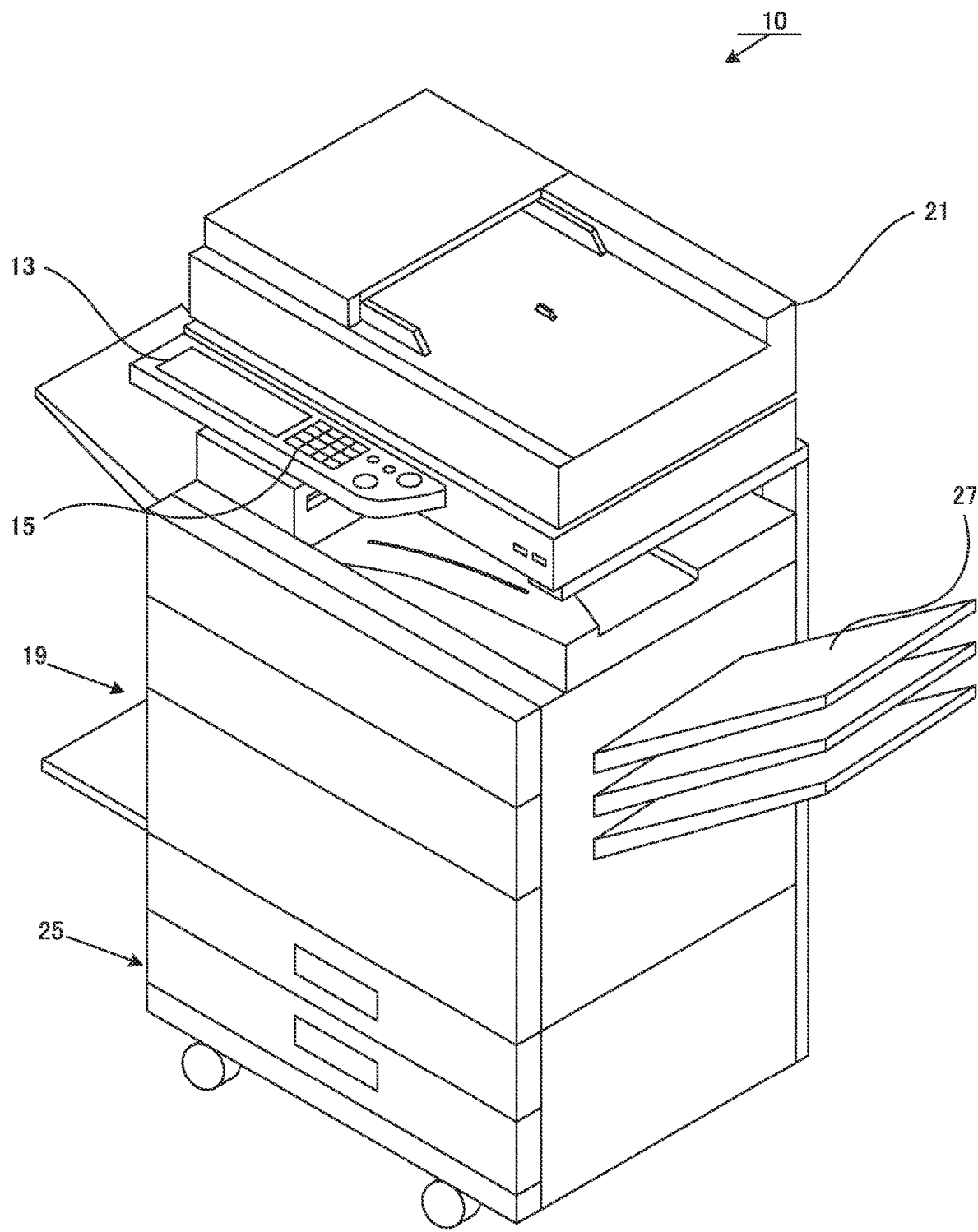
FIG. 2 is a perspective view illustrating the exterior of the multifunction peripheral according to the first embodiment.
Figure 3:
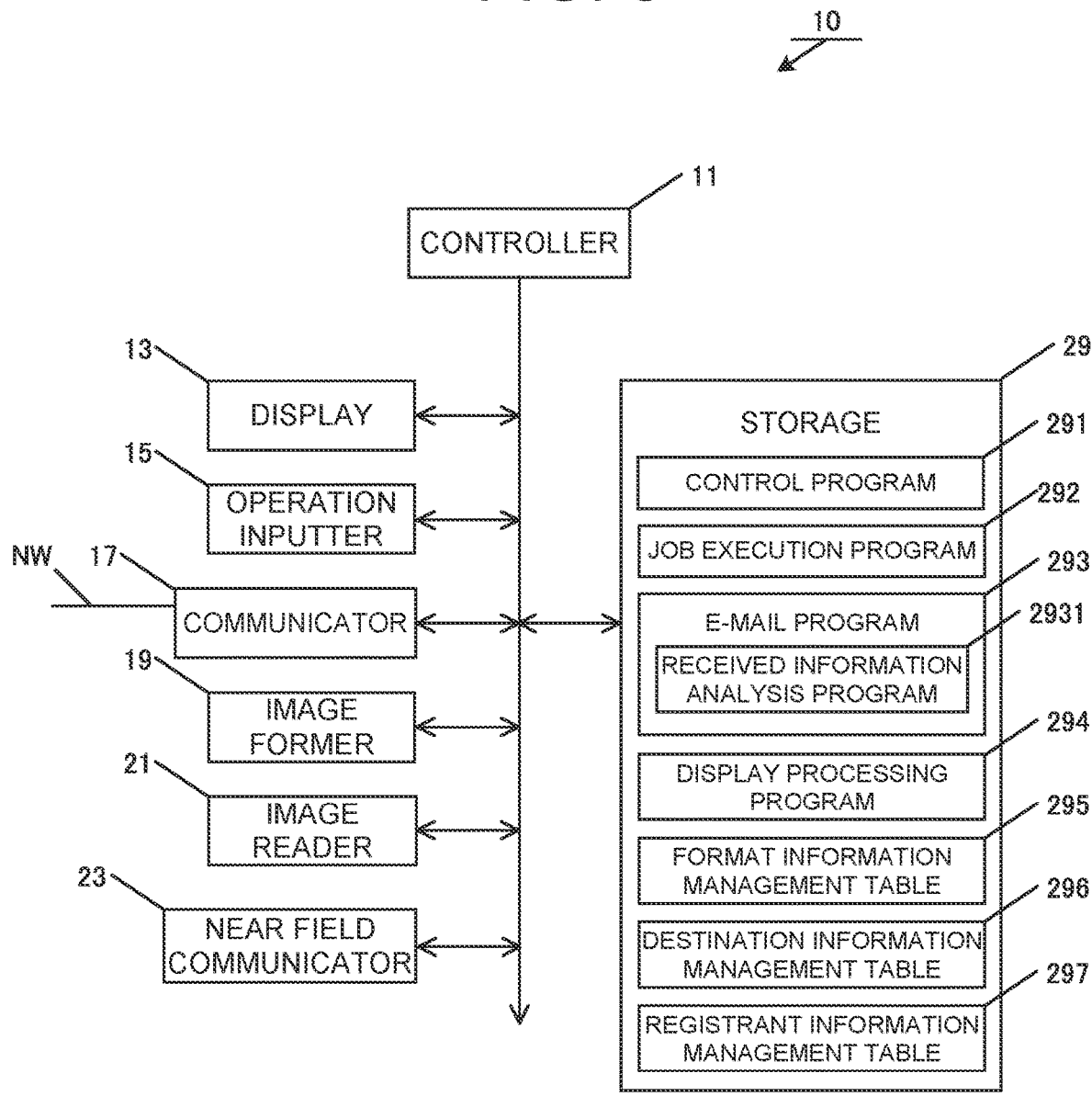
FIG. 3 illustrates a functional structure of the multifunction peripheral according to the first embodiment.

The functional structure of the multifunction peripheral 10 is described by referring to FIGS. 2 and 3. FIG. 2 is an external perspective view schematically illustrating the entire structure of the multifunction peripheral 10. FIG. 3 illustrates a functional structure of the multifunction peripheral 10. The multifunction peripheral 10 includes a controller 11, a display 13, an operation inputter 15, a communicator 17, an image former 19, an image reader 21, a near field communicator 23, and a storage 29.

The controller 11 controls the entire multifunction peripheral 10. The controller 11 includes, for example, one or more computing devices (for example, central processing units (CPUs)). The controller 11 reads and executes various programs stored in the storage 29 to implement functions thereof.

The display 13 displays various kinds of information to the user or the like. The display 13 may be provided as a liquid crystal display (LCD), an organic electro-luminescence (EL) display, or the like.

The operation inputter 15 accepts input of information by the user or the like. The operation inputter 15 may be provided as hard keys (for example, a numeric keypad), buttons, or the like. The operation inputter 15 can also be provided as a touch panel that allows input via the display 13. In that case, the touch panel can employ a general input method, such as a resistive, electromagnetic induction, or capacitive input method.

The communicator 17 includes either a wired or wireless interface or both interfaces to communicate with other devices via the LAN, the WAN, the Internet, telephone lines, fax lines, or the like. The communicator 17 also functions as a transmitter/receiver for transmitting and receiving e-mails.

The image former 19 forms images on paper, as a recording medium, based on the image data. The image former 19 feeds paper from a paper feeder 25, forms an image based on the image data on the paper, and then discharges the paper to a paper discharger 27. The image former 19 can include, for example, a laser printer using electrophotography. In that case, the image former 19 forms images using toners supplied from toner cartridges, which are not illustrated, each toner corresponding to a toner color (for example, cyan, magenta, yellow, or black).

The image reader 21 scans and reads a document image to be read and generates image data. The image reader 21 can be provided as a scanner including an image sensor such as a charge coupled device (CCD) or a contact image sensor (CIS). Any structure of the image reader 21 capable of generating image data by reading a reflected light image from the original image using the image sensor can be used.

The near field communicator 23 communicates with other devices such as the terminal device 50 using a near field communication protocol such as, for example, Wi-Fi (registered trademark), Bluetooth (registered trademark), infrared, near field communication (NFC), or radio frequency identification (RFID), for example. It is also possible for the communicator 17 to take some of the functions of the near field communicator 23.

The storage 29 stores various programs and data necessary for the operation of the multifunction peripheral 10. The storage 29 can include a storage such as a random access memory (RAM), a hard disk drive (HDD), a solid state drive (SSD), a read only memory (ROM), or the like.

In the first embodiment, the storage 29 stores a control program 291, a job execution program 292, an e-mail program 293, and a display processing program 294, and reserves a format information management table 295, a destination information management table 296, and a registrant information management table 297.

The control program 291 is a program read by the controller 11 to implement operations in a mode such as copy mode, fax mode, or scan mode. The controller 11 that has read the control program 291 implements each mode by controlling the display 13, the operation inputter 15, the communicator 17, the image former 19, the image reader 21, the near field communicator 23 and the like.

The job execution program 292 is a program read by the controller 11 to execute jobs in a mode such as copy mode, fax mode, or scan mode. The controller 11 that has read the job execution program 292 executes the job pertaining to the Scan to E-mail function or the like by controlling scanning and e-mail operations.

The e-mail program 293 is a program read by the controller 11 when transmitting and receiving e-mails. The controller 11 that has read the e-mail program 293 transmits/receives e-mails in accordance with the protocols such as the simple mail transfer protocol (SMTP), the post office protocol (POP), the Internet message access protocol (IMAP), and the like.

The e-mail program 293 also includes a received information analysis program 2931. The received information analysis program 2931 is a program read by the controller 11 when acquiring the destination information of an e-mail to be sent as the job from the received e-mail. When the received information includes destination information described in a predetermined format (hereinafter referred to as "format"), the controller 11 that has read the received information analysis program 2931 acquires the destination information.

The display processing program 294 is a program read by the controller 11 when controlling the display 13 and the operation inputter 15. The controller 11 that has read the display processing program 294 controls the output of, for example, a destination selection screen which will be described later. The controller 11 that has read the display processing program 294 can display, on the display 13, the e-mail address of the multifunction peripheral 10 and encoded information, which will be described later, encoding the e-mail address. In the present disclosure, the controller 11 is described as controlling the input/output of the touch panel, which is an integrated form of the display 13 and the operation inputter 15, but the display 13 and the operation inputter 15 can be provided separately and controlled independently.

The format information management table 295 is a table that manages information about formats. The controller 11 that has read the received information analysis program 2931 can determine whether the received information of the received e-mail includes destination information described in a predetermined format by referring to the format information management table 295.

Here, the format information management table 295 according to the first embodiment is described. FIG. 4 illustrates one form of the format information management table 295 according to the first embodiment. The format information management table 295 includes a format ID, a format, and a value. The format ID is an identifier that uniquely identifies the format. The format is a string of characters to be identified as a format. The value represents any value included in the format.

Here, the format of format ID "#01" is represented by the format "Scan" which is referred to as the standard format. The standard format is used to identify that the e-mail includes destination information pertaining to the job of the Scan to E-mail function. The format "Scan" pertaining to the format "#01" is described in the subject field. Upon receipt of the e-mail with "Scan" described in the subject field, the controller 11 recognizes this e-mail as an e-mail pertaining to the job of the Scan to E-mail function and distinguishes it from other e-mails not relevant to the Scan to E-mail, such as error mails or junk mails.

The format of format ID "#02" is represented by the format "Pass:[]" which is a format related to the private function. The format "Pass:[]" pertaining to the format ID "#02" is described in the body, and any password (***) described in the bracket "[]" of the format is set as the value. Upon receipt of the e-mail with "Pass: [*]" authenticating the user described in the body, the controller 11 notifies the user that the destination of the e-mail is set and asks the user to enter the password when the operation pertaining to the Scan to E-mail function is performed. Only when the entered password matches the value "***", the controller 11 automatically sets the destination of the e-mail or prompts the user to select the destination.

The format of format ID "#03" is represented by the format "Time: []" which is relevant to the setting of a predetermined time period. The format "Time: []" pertaining to the format ID "#03" is described in the body, and any predetermined time period described in the bracket "[]" in the body is set as the value. Upon receipt of the e-mail with "Time: [*****] " described in the body, the controller 11 suspends processing of the e-mail until the predetermined time period has elapsed. As used herein, the predetermined time period is a period of time that is set when the time required for the e-mail to actually reach the multifunction peripheral 10 after the user transmits it to the multifunction peripheral 10 is expected to exceed a predetermined default setting time period (for example, 5 minutes). Any predetermined time period can be set, for example, in seconds, minutes, hours, as well as days, months, years, or even specific dates can be designated.

The format of format ID "#04" is represented by the format "CC: []" which is a format related to the broadcast transmission function. The format "CC: []" pertaining to the format ID "#04" is described in the body, and any e-mail address (***@*) described in the bracket "[]" in the body is set as the value. Upon receipt of the e-mail with "CC: [*@*]" described in the body, the controller 11 can perform broadcast transmission to the e-mail address set as the value. The e-mail address described in "CC: [*@***] " is not displayed on the destination selection screen which will be described later, but is displayed as "with broadcast transmission ".

The format of format ID "#05" is represented by the format "TO: []" which is a format related to the destination (TO) adding function of adding a destination in addition to the return e-mail address and the e-mail address in the Reply to field. The format "TO: []" pertaining to the format ID "#05" is described in the body, and the e-mail address (***@*) described in the bracket "[]" in the body is set as the value. Upon receipt of the e-mail with "TO: [*@*]" described in the body, the controller 11 can transmit the e-mail to the e-mail address set as the value. The e-mail address described in "TO: [*@***]" is displayed on the destination selection screen which will be described later.

The format of format ID "#06" is represented by the format "BCC: []" which in the first embodiment is a format related to the function similar to the broadcast transmission function. The format "BCC: []" pertaining to the format ID "#06" is described in the body, and an e-mail address (***@*) described in the bracket "[]" of the format is set as the value. Upon receipt of the e-mail with "BCC: [*@*]" described in the body, the controller 11 can transmit the e-mail to the e-mail address set as the value. The e-mail address described in "BCC: [*@***] " is not displayed on the destination selection screen which will be described later, but is displayed as "with BCC transmission".

The format of format ID "#07" is a format related to a combination of formats "#01" to "#06". The format pertaining to the format ID "#07" may include all or part of the formats "#01" to "#06".

Returning to FIG. 3, the destination information management table 296 is a table that manages the destination information acquired from the received information of the received e-mail. Here, one form of the destination information management table 296 according to the first embodiment is described by referring to FIG. 5A.

The destination information management table 296 includes an e-mail ID, a return e-mail address, a format ID, and an e-mail address. The e-mail ID is an identifier that uniquely identifies the received e-mail. The return e-mail address represents the return (source) e-mail address of the e-mail described in the header of the received e-mail. When the e-mail address is set in the Reply to field, the e-mail address is also acquired. The format ID represents a predetermined format included in the received information of the received e-mail and represented by the format ID. The e-mail address represents the e-mail address described in this format when the predetermined format included in the received information is the format pertaining to the format IDs "#04" to "#07". The destination information management table 296 can further include items related to receipt of the e-mail, such as date and time information on receipt of the e-mail identified by the e-mail ID, the number of times of receipt, and the like.

In an example, the e-mail pertaining to e-mail ID "#1011" includes a return (source) e-mail address "user1@sample.com", and "nnnn@sample.com" is described in the Reply to field. The e-mail of the e-mail ID "#1011" is an example that includes "Scan" pertaining to the standard format in the subject field, and a predetermined password (not illustrated) pertaining to the format ID "#02" and the e-mail address for the broadcast transmission function ("cccc@xyz.com") pertaining to the format ID "#04" are described in the body of the e-mail.

The e-mail of the e-mail ID "#1020" is an example in which the return (source) e-mail address is set to "user3@sample.com". The e-mail of the e-mail ID "#1020" represents an example in which the subject field includes "Scan" pertaining to the standard format, but the body of the e-mail does not include destination information in the predetermined format.

The controller 11 can set the destination of the e-mail to be sent as the job by referring to the destination information management table 296.

Returning to FIG. 3, the registrant information management table 297 is a table that manages the registrant information registered in the multifunction peripheral 10 which is so-called an address book. One form of the registrant information management table 297 managed by the multifunction peripheral 10 is described by referring to FIG. 5B.

The registrant information management table 297 includes the registrant ID, the name of the registrant, and the e-mail address. The registrant ID is an identifier that uniquely identifies a registrant who has registered with the multifunction peripheral 10. The name of the registrant represents a name or an appellation of the registrant. The e-mail address represents the e-mail address of the registrant. In addition to the items illustrated in FIG. 5B, the registrant information management table can also include other registration items such as the residential address, the telephone number, the fax number, the name of the department, and the like.

For example, the registrant name "yamada taro", identified by the registrant ID "RI01", has a registered e-mail address "yamada@sample.com". The e-mail addresses registered in the registrant information management table 237 can be used as the address of the e-mail for the Scan to E-mail function and the like.

1.2.2 Terminal Device 50

The terminal devices 50a, 50b, and 50c can be provided as information processing terminal devices such as smartphones, tablets, cell phones, laptop computers, desktop computers, or the like. Since the terminal devices 50a, 50b, and 50c can have the same structure, they are described as a terminal device 50 in the following description.

Figure 6:
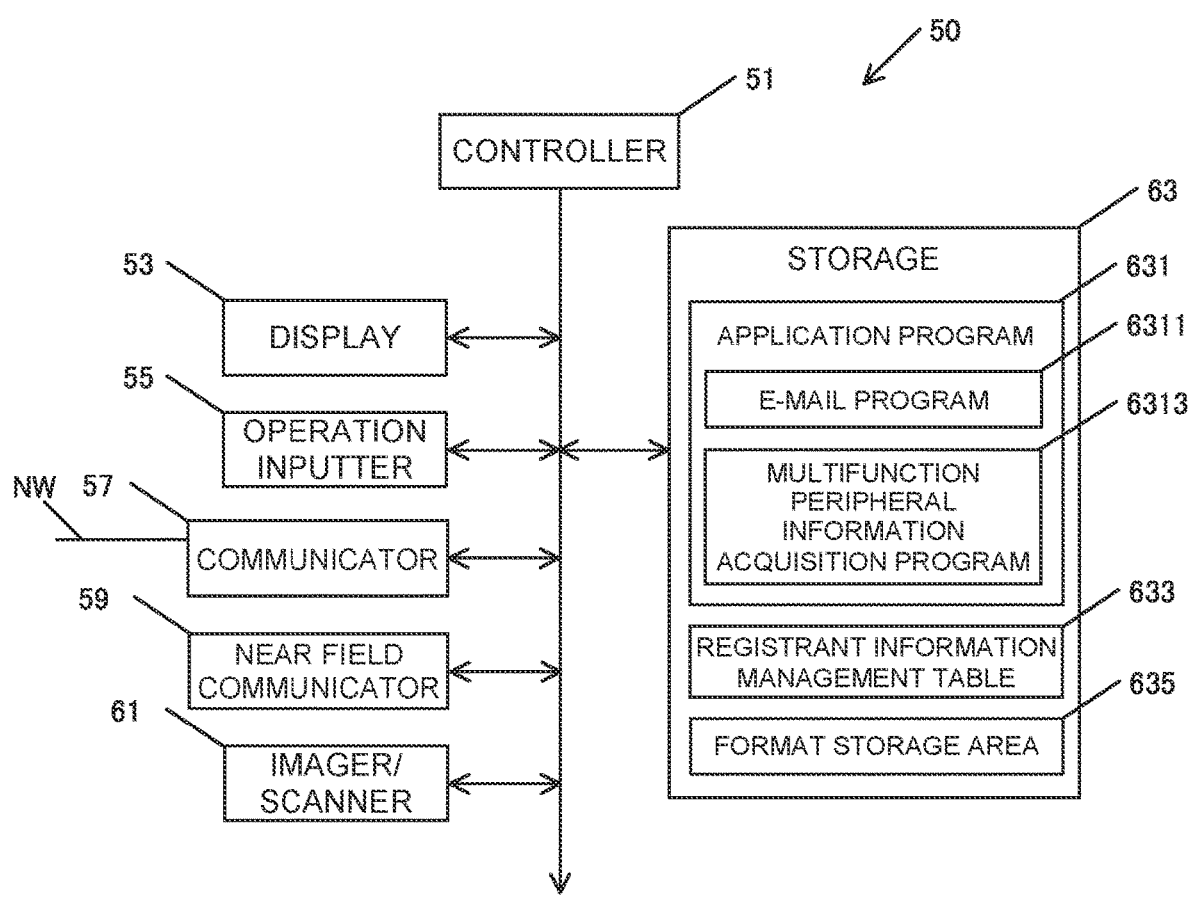
FIG. 6 illustrates a functional structure of a terminal device according to the first embodiment.

FIG. 6 illustrates a functional structure of the terminal device 50. The terminal device 50 includes a controller 51, a display 53, an operation inputter 55, a communicator 57, a near field communicator 59, an imager/scanner 61, and a storage 63.

The controller 51 controls the entire terminal device 50. The controller 51 includes, for example, one or more computing devices (CPU or the like), and implements its functions by invoking and executing various programs stored in the storage 63.

The display 53 displays various kinds of information to the user or the like. The display 53 can be provided as the LCD, the EL display, or the like. The display 53 can display, for example, the destination selection screen for selecting a destination for transmitting the e-mail in accordance with display control by the controller 51 that has read an application program 631.

The operation inputter 55 accepts input of information by the user or the like. The operation inputter 55 can be provided as a touch panel that allows input via the display 53. In that case, the touch panel can employ, for example, a resistive, infrared, electromagnetic induction, or capacitive input method.

The communicator 57 includes either a wired or wireless interface or both interfaces to communicate with other devices via the LAN, the WAN, the Internet, telephone lines, or the like. The communicator 57 also functions as a transmitter/receiver for transmitting/receiving e-mails.

The near field communicator 59 communicates with other devices such as the multifunction peripheral 10 or the like using near field communication protocols such as Wi-Fi (registered trademark), Bluetooth (registered trademark), infrared, NFC, RFID, or the like. The near field communicator 59 communicates with the near field communicator 23 of the multifunction peripheral 10 and can also acquire the e-mail address of the multifunction peripheral 10 when the e-mail address is provided in electronic data. The communicator 57 can take some of the functions of the near field communicator 59.

Examples of the imager/scanner 61 include an imaging device, such as a camera, and a scanning device using a laser beam. The imager/scanner 61 can acquire the e-mail address displayed by the multifunction peripheral 10 based on the control by the controller 51 that has read multifunction peripheral information acquisition program 6313. Any structure of the imager/scanner 61 capable of acquiring e-mail addresses from the multifunction peripheral 10 can be used.

The storage 63 stores various programs and data necessary for the operation of the terminal device 50. The storage 63 can include a storage, such as a RAM, an HDD, an SSD, a ROM, or the like.

In the first embodiment, the storage 63 stores an application program 631 and reserves a registrant information management table 633 and a format storage area 635.

For example, the application program 631 is a program that is read by the controller 51 when executing various applications such as calls, faxes, SNS, video/music viewing, games, and the like. In addition to such various applications, the application program 631 includes an e-mail program 6311 and a multifunction peripheral information acquisition program 6313.

The e-mail program 6311 is a program read by the controller 51 when transmitting and receiving e-mails. The controller 51 that has read the e-mail program 6311 transmits and receives e-mails based on protocols such as the SMTP, the POP, the IMAP, and the like. The controller 51 that has read the e-mail program 6311 can compose an e-mail described in accordance with the format stored in the format storage area 635 and transmit the e-mail to the multifunction peripheral 10.

The multifunction peripheral information acquisition program 6313 is a program read by the controller 51 when acquiring the e-mail address of the multifunction peripheral 10 from the multifunction peripheral 10. The controller 51 that has read the multifunction peripheral information acquisition program 6313 acquires the e-mail address of the multifunction peripheral 10 by controlling the communicator 57, the near field communicator 59, the imager/scanner 61, and the like.

The registrant information management table 633 is a table that manages the registrant information registered in the terminal devices 50 which is so-called an address book. Here, one form of the registrant information management table 633 managed by the terminal device 50 is described by referring to FIG. 7.

The registrant information management table 633 includes the registrant ID, the name of the registrant, and the e-mail address. The registrant ID is an identifier that uniquely identifies a registrant who has registered with the terminal device 50. The name of the registrant represents a name or an appellation of the registrant. The e-mail address represents the e-mail address of the registrant. In addition to the items illustrated in FIG. 7, the registrant information management table 633 can also include other registration items such as an address/residence, a telephone number, a fax number, a name of the department, and the like.

For example, the registrant name "aiueo", identified by the registrant ID "001", has a registered e-mail address "cccc@xyz.com". The e-mail addresses managed in the registrant information management table 633 can be used as destinations for transmitting normal e-mails or e-mails described in accordance with a predetermined format.

The format storage area 635 is a storage area that stores the formats described above. As illustrated in FIG. 8, the format storage area 635 stores formats for each format ID (format IDs #01 to #07). After reading the e-mail program 6311, the controller 51 can compose an e-mail described in accordance with the format stored in the format storage area 635 and transmits the e-mail to the multifunction peripheral 10.

1.2.3 E-mail Server 90

The e-mail server 90 is an e-mail server that transmits e-mails from the terminal device 50 to the multifunction peripheral 10. Any e-mail server 90 having the functions and structure of an SMTP server, a POP server, an IMAP server, a domain name system (DNS) server, and the like can be used, and an ordinary e-mail distribution service available from a general provider can be used. Therefore, the description of the e-mail server 90 is omitted herein.

1.3 Process Flow

Figure 9:
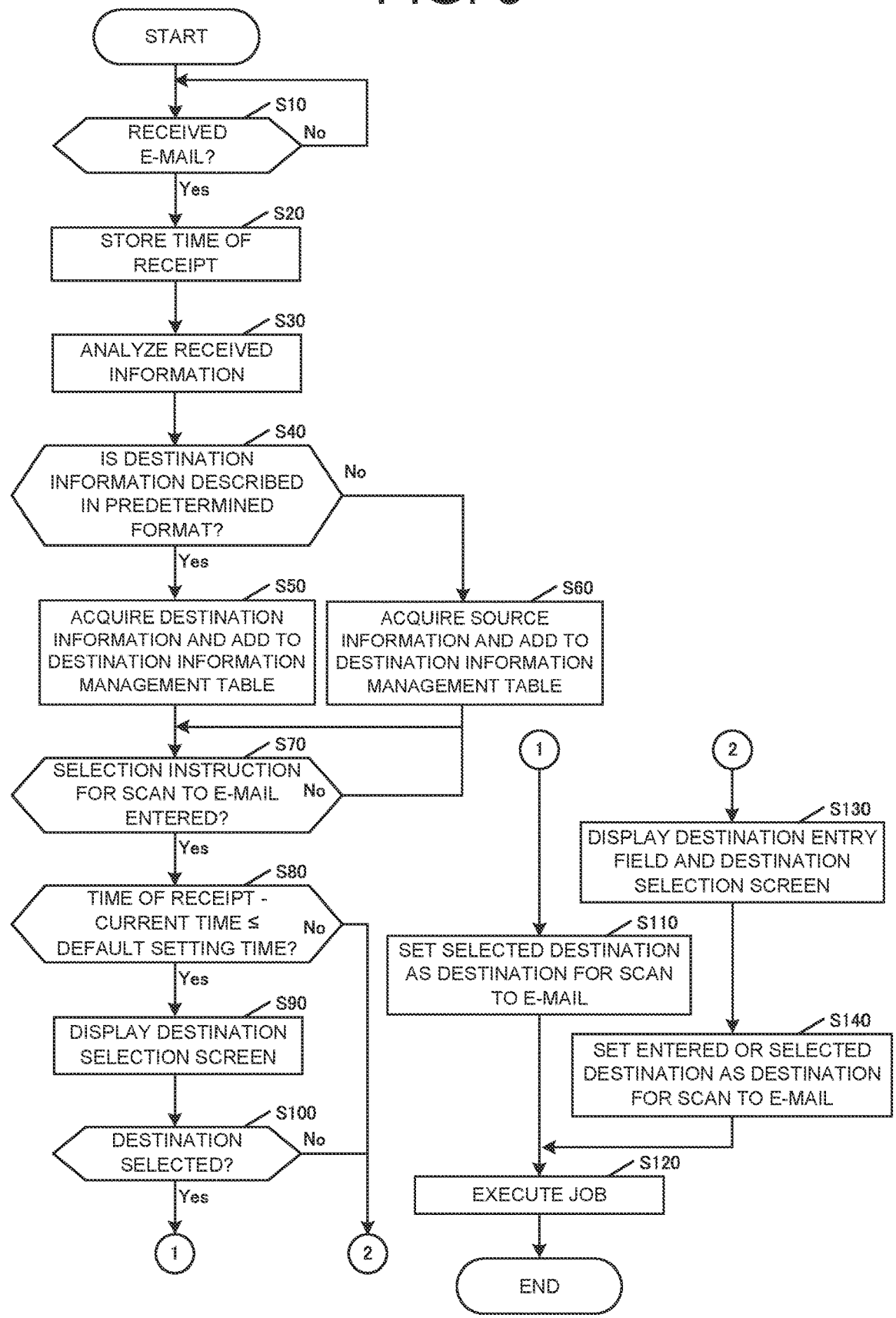
FIG. 9 is a flowchart explaining a process flow according to the first embodiment.

Next, a process flow of the first embodiment will be described. FIG. 9 is a flowchart explaining the process flow of the multifunction peripheral 10. This process can be executed by the controller 11 of the multifunction peripheral 10 by reading the control program 291, the job execution program 292, the e-mail program 293, and the display processing program 294, and the like.

First, the controller 11 determines whether an e-mail has been received (step S10). If it is determined that the e-mail is received, the controller 11 stores the time of receipt (step S10: Yes→step S20). If it is determined that no e-mail has been received, the controller 11 waits until the e-mail is received (step S10: No).

The controller 11 analyzes the received information of the received e-mail (step S30). As a result of the analysis of the received information, the controller 11 determines whether the received information includes destination information described in a predetermined format (see, for example, FIGS. 4 and 9) (step S40).

If it is determined that the destination information described in the predetermined format is included, the controller 11 acquires the destination information and adds the acquired destination information to the destination information management table 296 (step S40: Yes→step S50). If it is determined that the e-mail includes no destination information described in the predetermined format, the controller 11 acquires the return (source) e-mail address or the e-mail address, if set in the Reply to field, from the header of the e-mail as the destination information, and adds the acquired e-mail address to the destination information management table 296 (step S40: No→step S60).

Subsequently, the controller 11 determines whether a job selection instruction based on the Scan to E-mail function is entered (step S70). The job selection instruction based on the Scan to E-mail function can be accepted via, for example, a home screen which is not illustrated.

When it is determined that the selection instruction for the Scan to E-mail function has been accepted, the controller 11 determines whether the difference between the time the e-mail is received and the current time is less than or equal to the default setting time (for example, five minutes) set by default (step S70: Yes→step S80). If it is determined that no input of the Scan to E-mail execution instruction has been received, the controller 11 waits until the input of the execution instruction is received (step S70: No).

If it is determined that the difference between the time of receipt of the e-mail and the current time is less than or equal to the default setting time, the controller 11 displays the destination selection screen on the display 13, which will be described later (step S80: Yes→step S90).

Then, the controller 11 determines whether the destination of the e-mail as a job is selected by the user via the displayed destination selection screen (step S100). If it is determined that the e-mail destination has been selected by the user, the controller 11 sets the destination selected by the user as the Scan to E-mail address (step S100: Yes→step S110). The controller 11 then executes the job and ends the process (step S120).

On the other hand, if it is determined that the difference between the time of receipt of the e-mail and the current time is longer than the default setting time (step S80: No), or if it is determined that no destination of the e-mail is selected by the user (step S100: No), the controller 11 displays the destination input field and the destination selection screen (step S130).

Subsequently, the controller 11 sets the destination entered via the destination input field or selected via the destination selection screen as the Scan to E-mail address (step S140). The controller 11 then executes the job and ends the process (step S120).

Figure 10:
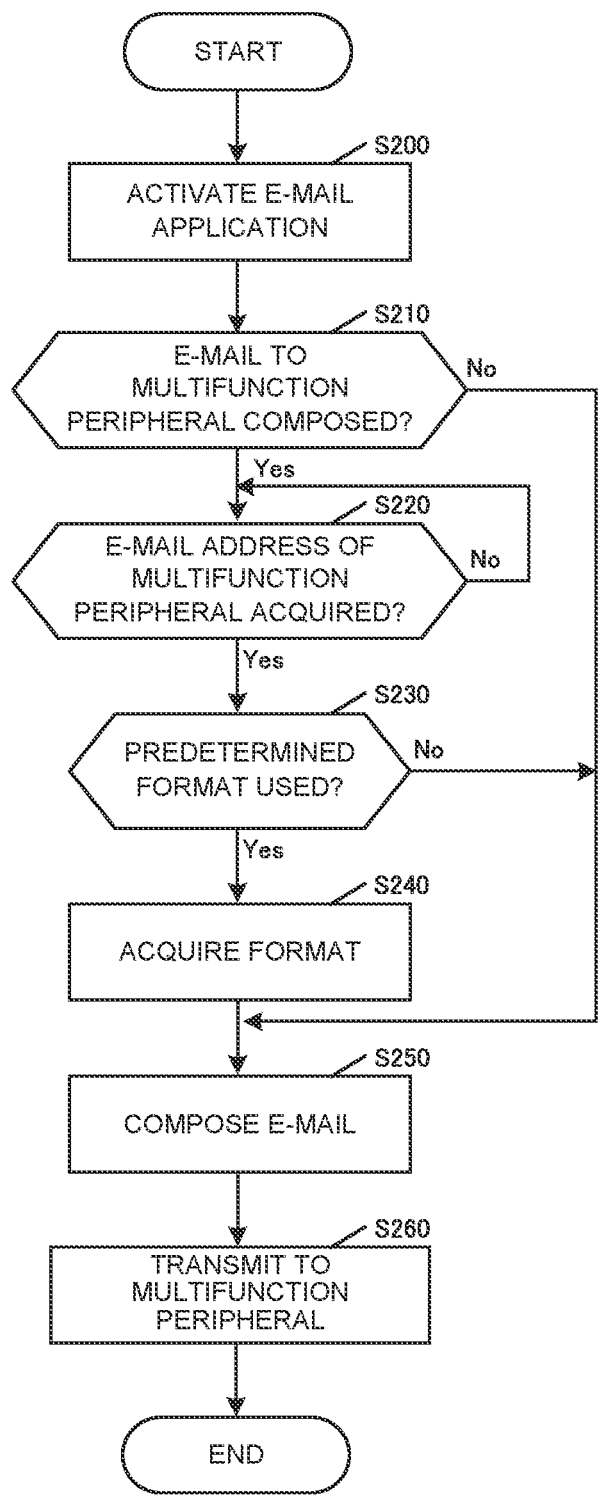
FIG. 10 is a flowchart explaining a process flow according to the first embodiment.

FIG. 10 is a flowchart explaining the process flow of the terminal device 50. This process can be executed by the controller 51 of the terminal device 50 reading the e-mail program 6311, the multifunction peripheral information acquisition program 6313, and the like of the application program 631.

First, the controller 51 receives an activation instruction by the user and starts the e-mail application by reading the e-mail program 6311 (step S200).

Next, the controller 51 determines whether the operation via the e-mail application is an operation related to composing the e-mail addressed to the multifunction peripheral 10 (step S210). Whether the operation is related to composing the e-mail addressed to multifunction peripheral 10 can be determined by detecting, for example, an operation to specify the e-mail address addressed to multifunction peripheral 10, or an operation to acquire the e-mail address of the multifunction peripheral 10 via the communicator 57, the near field communicator 59, the imager/scanner 61, or the like.

If it is determined that the operation is related to composing the e-mail addressed to the multifunction peripheral 10, the controller 51 determines whether the e-mail address of the multifunction peripheral 10 has been acquired (step S210: Yes→step S220). On the other hand, if it is not determined that the operation is related to composing the e-mail addressed to the multifunction peripheral 10, the controller 51 displays an e-mail composing screen on the display 13, which is not illustrated, and composes the e-mail in accordance with the user operation (step S210: No→step S250).

If it is determined that the e-mail address of the multifunction peripheral 10 has been acquired, the controller 51 determines whether the e-mail uses a predetermined format (step S230). If it is determined that no e-mail address of the multifunction peripheral 10 is acquired, the controller 51 waits until the e-mail address is acquired (step S220: No).

If it is determined that the e-mail uses a predetermined format, the controller 51 acquires a corresponding format from the format information management table 295 (step S230: Yes→step S240). If there is no need to acquire the corresponding format, and the user directly composes the e-mail in the format of the predetermined format, the process pertaining to step S240 can be omitted.

The controller 51 then composes the e-mail (step S250), transmits the composed e-mail to the multifunction peripheral 10 (step S260), and ends the process.

1.4 Operation Example

Figure 11:
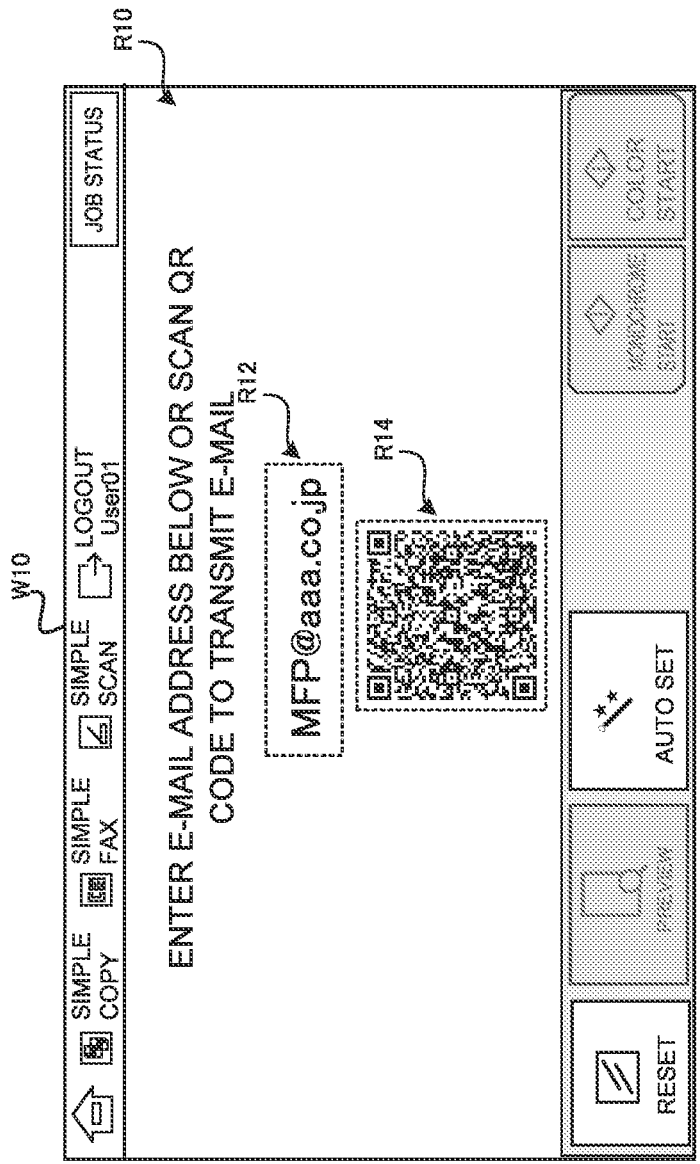
FIG. 11 is a view explaining an operation example according to the first embodiment.

Next, an operation example according to the first embodiment is described. FIG. 11 is a display example of the e-mail address displayed by the multifunction peripheral 10 via the display 13. In displaying the e-mail address on the display 13, the controller 11 can display its own e-mail address by reading the display processing program 294.

An e-mail address display screen W10 illustrated in FIG. 11 includes an e-mail address display area R10. The e-mail address display area R10 includes an address direct display area R12 and an encoded information display area R14.

The address direct display area R12 is an area where the e-mail address of the multifunction peripheral 10 is displayed directly as a string of characters (characters: numbers, English alphabet, kana, hiragana, kanji, symbols, and the like). The user can transmit the e-mail to the multifunction peripheral 10 by entering the e-mail address displayed in the address direct display area R12 via an e-mail application running on the terminal device 50.

The encoded information display area R14 is an area where the e-mail address of the multifunction peripheral 10 is displayed as encoded information. The encoded information may be a one-dimensional code such as a bar code (for example, the European Article Number (EAN) code, the Japanese Article Number (JAN) code, Codabar, CODE128, or the like), or a two-dimensional code. The two-dimensional code may be a stacked two-dimensional code (for example, PDF417, CODE49, or the like), or a matrix two-dimensional code (for example, a quick response code (QR code (registered trademark)), DataMatrix, VeriCode, Aztec, or the like). In the description below, the QR code (registered trademark) is used as an example of the encoded information. The user can acquire the encoded information via the imager/scanner 61 of the terminal device 50. The e-mail address of the multifunction peripheral 10 can then be acquired by decoding the acquired encoded information.

Figure 12:
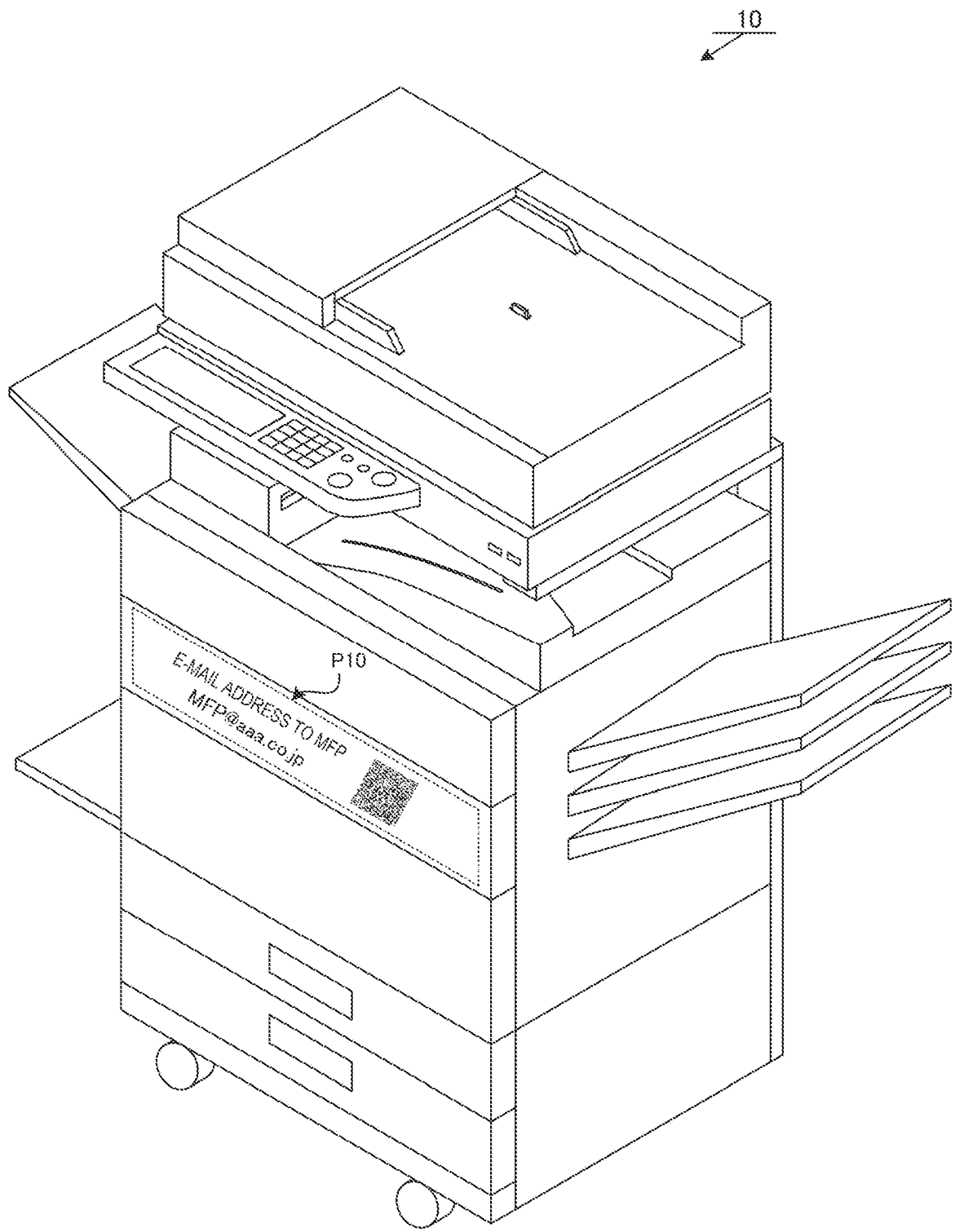
FIG. 12 is a view explaining an operation example according to the first embodiment.

The e-mail address of the multifunction peripheral 10 to be displayed in the address direct display area R12 and the encoded information display area R14 can be displayed on the exterior of the multifunction peripheral 10, for example, as illustrated in FIG. 12. In this case, the e-mail address or encoded information to be displayed in the address direct display area R12 and/or encoded information display area R14 can be provided on a sealing material or the like and fixed by pasting or otherwise attaching it to a predetermined position P10 on the exterior of the multifunction peripheral 10.

FIGS. 13A and 13B illustrate example structures of the operation screen of the e-mail application running on the terminal device 50. An operation screen W20a illustrated in FIG. 13A represents the operation screen immediately after the e-mail address is acquired from the multifunction peripheral 10 (for example, immediately after the QR code (registered trademark) is read). On the other hand, an operation screen W20b illustrated in FIG. 13B represents the operation screen when the destination information is described by the user in a predetermined format subsequent to acquiring the e-mail address from the multifunction peripheral 10. FIGS. 13A and 13B explain an example of operation when the user1 pertaining to the registrant ID "010" registered in the terminal device 50 transmits the e-mail to the multifunction peripheral 10 (see FIG. 7).

As illustrated in FIG. 13A, the operation screen W20a includes a header HE10 and a body BD10. The header HE10 includes the e-mail address "user1@sample.com" of the user (user1) who has transmitted the e-mail, the destination e-mail address "MFP@aaa.ca.jp" of the multifunction peripheral 10, and the subject (Subject) "Scan".

FIG. 13A illustrates an example in which the e-mail address of the multifunction peripheral 10 acquired by the method described in, for example, FIGS. 11 and 12 is set as the e-mail destination, and the value "Scan" pertaining to the standard format is set in the subject field.

The body BD10 displays "Add another destination" to allow the input of value pertaining to the format ID "#04".

By describing the destination (the destination of broadcast transmission) in accordance with the format ID "#04" in the "Add another destination" field in the body BD10, the user can transmit the e-mail to the described destination.

For example, FIG. 13B is an example in which the user has added "CC: [ccc@xyz.com] as another destination in accordance with the format ID "#04". Thus, by describing the destination in the body BD10 in accordance with the predetermined format as another destination, the e-mail can be sent to that destination.

Figure 14A:
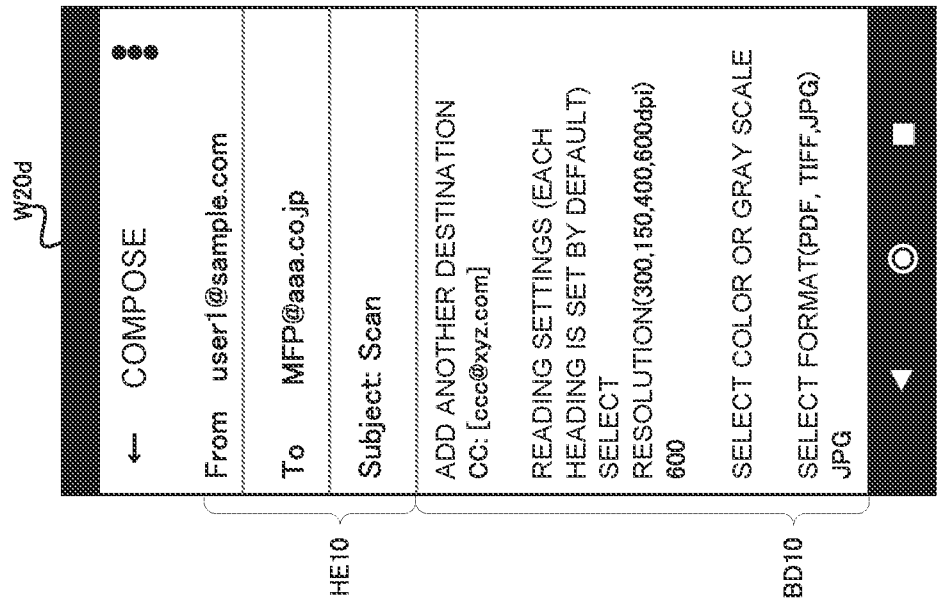
FIGS. 14A and 14AB are views explaining operation examples according to the first embodiment.

FIG. 14A explains an operation screen W20c according to another form of the operation screen W20a illustrated in FIG. 13A. The operation screen W20c illustrated in FIG. 14A includes optional items, such as "Reading setting", "Resolution selection", "(Color, Grayscale) selection ", "Format selection", and the like, in addition to "Add another destination" pertaining to the format ID "#04" in the body BD10. Such optional items can be selectable by the user, and the selected items can be sent to the multifunction peripheral 10 together with the job settings information pertaining to the Scan to E-mail function.

Figure 14B:
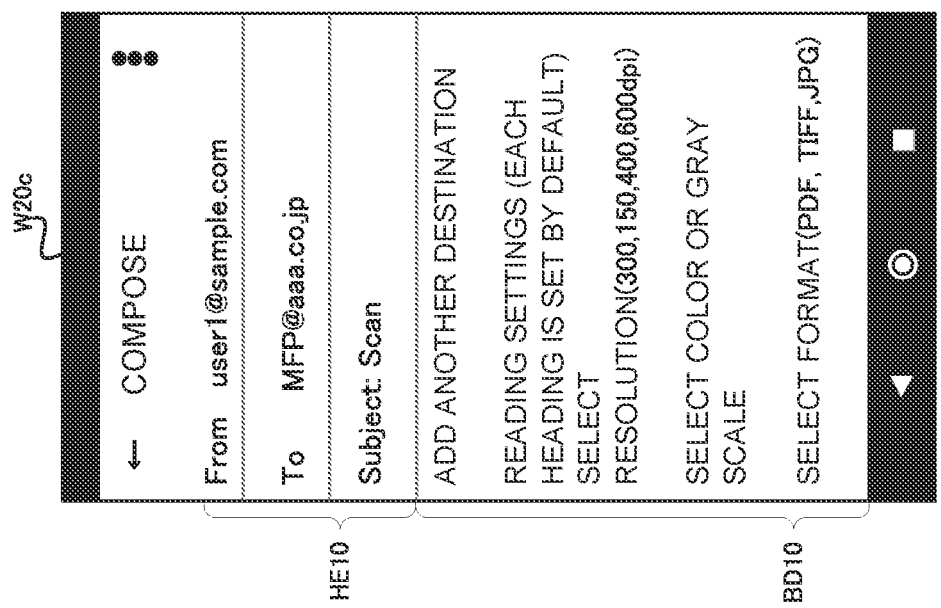

FIG. 14B illustrates an operation screen W20d when the user adds "CC: [ccc@xyz.com] as another destination based on the format ID "#04", and also selects "Resolution selection: 600" and the "Format selection: JPG". In this way, the destination can be described in accordance with the predetermined format in the body BD10 as another destination, and the job related to the Scan to E-mail function can be set. Accordingly, the e-mail can be sent to the desired destination based on the desired settings.

Figure 15:
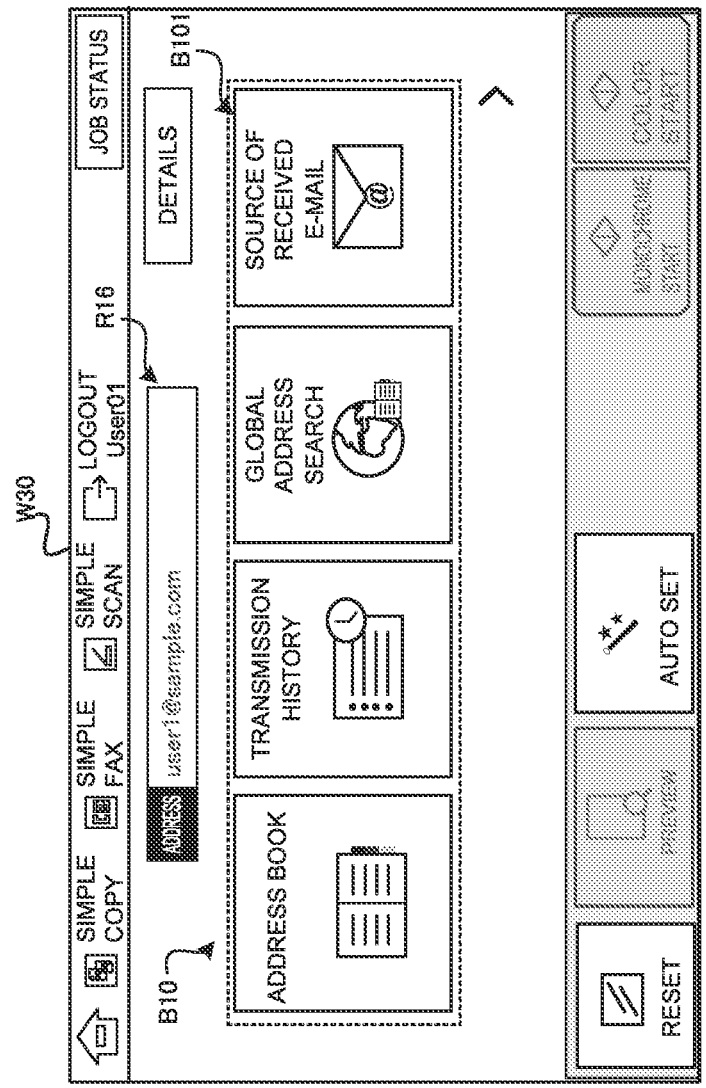
FIG. 15 is a view explaining an operation example according to the first embodiment.

FIG. 15 illustrates an example structure of a simple setting screen W30 displayed on the multifunction peripheral 10. The simple setting screen W30 illustrated in FIG. 15 is a setting screen for setting up an image transmission job that functions primarily in the e-mail transmission operating mode. FIG. 15 is also an example structure of the simple setting screen W30 displayed on the multifunction peripheral 10 when it has received the e-mail sent via the operation screens W20a to W20d of the terminal device 50 as illustrated in, for example, FIGS. 13 and 14.

The simple setting screen W30 includes setting value buttons B10. The setting value buttons B10 accept the user selection and input of settable setting values via the simple setting screen W30. For example, the user can select the address book button and set the destination of the image data generated by scanning as the setting value via a destination selection screen which will be described later. The destination selection screen displayed by selecting the address book button can be generated based on the registrant information management table 297 described in FIG. 5B.

The setting value buttons B10 illustrated in FIG. 15 include a transmission history button, a global address search button, and a received e-mail button B101, in addition to the address book button, provided as examples of buttons for the setting values settable by the user.

Here, the display of the received e-mail button B101 is active to allow the user to select the button when the multifunction peripheral 10 receives the e-mail from the terminal device 50. At this time, the source e-mail address of the received e-mail ("user1@sample.com" in the examples of FIGS. 13 and 14) is displayed in an address display area R16 as the return address (address) of the e-mail to be sent as the job.

Figure 16:
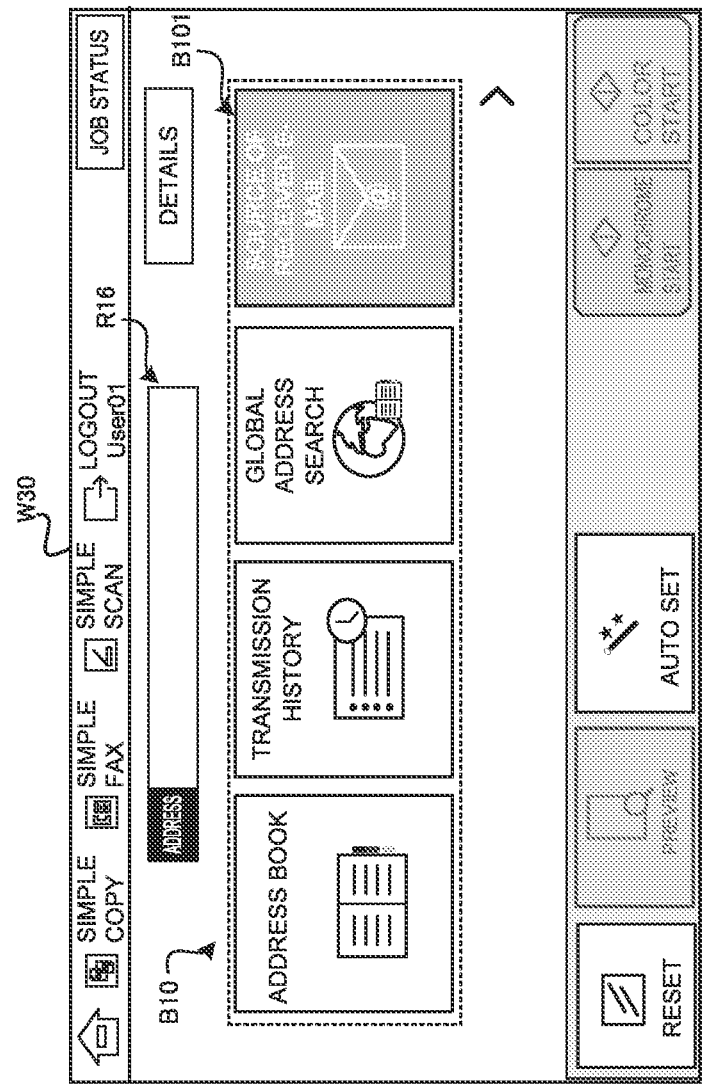
FIG. 16 is a view explaining an operation example according to the first embodiment.

On the other hand, if no e-mail is received from the terminal device 20, the received e-mail button B101 is grayed out so that it cannot be selected by the user, as illustrated in FIG. 16. In addition, since no e-mail is received, the return address (address) of the e-mail is not displayed in the address display area R16.

Figure 17:
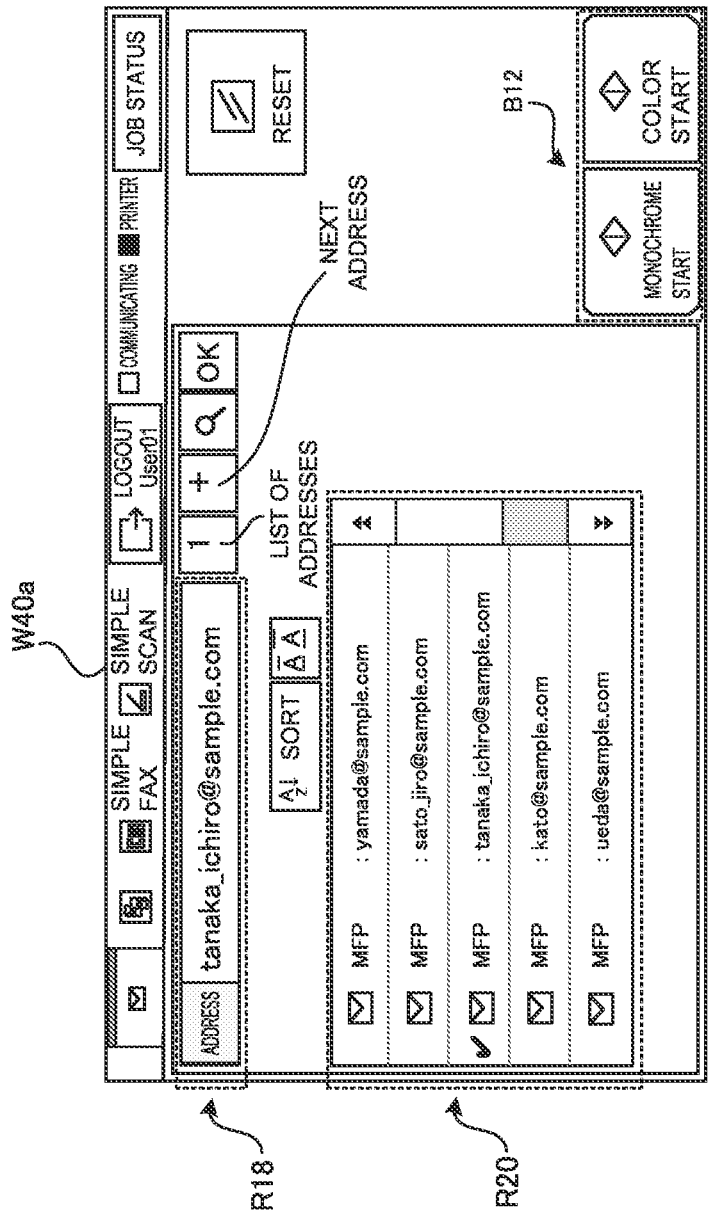
FIG. 17 is a view explaining an operation example according to the first embodiment.

FIG. 17 illustrates an example structure of a destination selection screen W40a according to the first embodiment. The destination selection screen W40a illustrated in FIG. 17 can be displayed by, for example, selecting the address book button on the simple setting screen W30 described in FIG. 16. In this case, the controller 11 can generate the destination selection screen W40a based on the registrant information registered in the registrant information management table 297.

The destination selection screen W40a includes a selected address display area R18, a destination selection area R20, and start buttons B12. The selected address display area R18 displays the destination selected as the destination of the e-mail in the destination selection area R20. In addition to the selected destination, the selected address display area R18 may also display the destination directly entered by the user. The selected or entered destination is set as the e-mail address.

The destination selection area R20 selectively displays the e-mail address pertaining to the registrant IDs "RI01" to "RI05" registered in the registrant information management table 297. The start buttons B12 include a monochrome start button and a color start button. When the user wants to transmit a monochrome image, the user selects the monochrome start button. When the user wants to transmit a color image, the user selects the color start button. When either the monochrome start button or the color start button is selected by the user, the controller 11 executes processing pertaining to the image transmission job.

Figure 18:
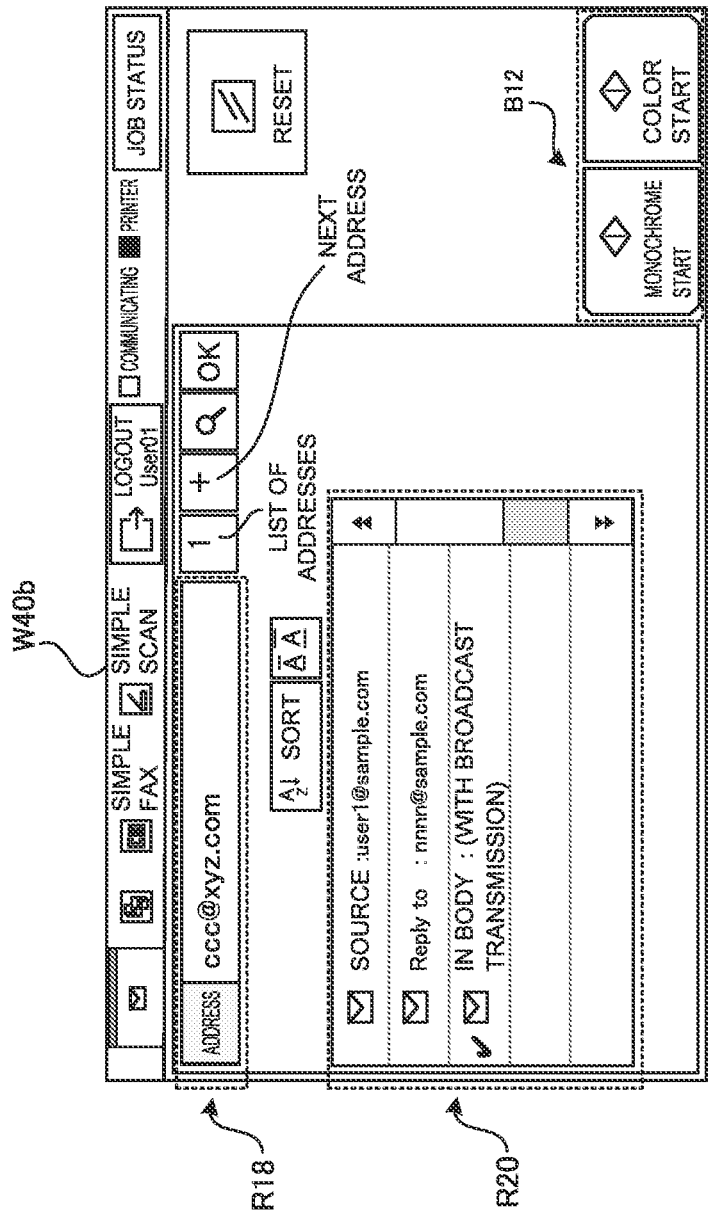
FIG. 18 is a view explaining an operation example according to the first embodiment.

FIG. 18 illustrates an example structure of a destination selection screen W40b displayed by the controller 11 when the received e-mail button B101 described in FIG. 15 is selected. The destination selection screen W40b can have the same structure as the destination selection screen W40a described above, except that the e-mail addresses displayed in the destination selection area R20 are based on the received information (destination information) of the received e-mails.

The destination selection screen W40b illustrates an example of display of the destination information acquired from the received information of the e-mail pertaining to the e-mail ID "#1011" of the destination information management table 296 in FIG. 5A. For example, the source e-mail address of the e-mail pertaining to the e-mail ID "#1011" is "user1@sample.com", and the e-mail address set as the Reply to address is "nnnn@sample.com". The e-mail address ("cccc@xyz.com") of the broadcast transmission function pertaining to the format ID "#04" is described in the body. In the destination selection area R20, the e-mail address pertaining to the broadcast transmission function described in the body is not displayed, and only displaying "with broadcast transmission" indicating that the e-mail address pertaining to the broadcast transmission function is described. Alternatively, the e-mail address pertaining to the broadcast transmission function may not be directly displayed in the destination selection area R20, and may be displayed in the selected address display area R18 when selected as the address of the e-mail (for the Scan to E-mail function), as illustrated in FIG. 18.

Figure 19:
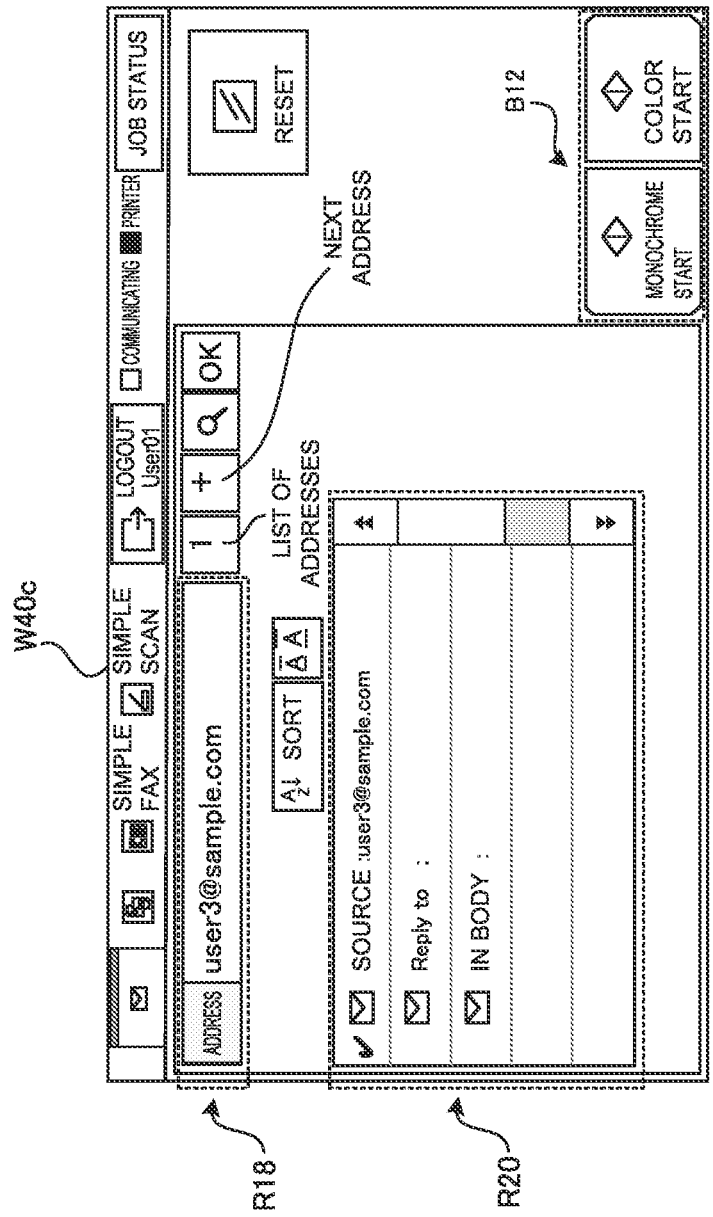
FIG. 19 is a view explaining an operation example according to the first embodiment.

A destination selection screen W40c illustrated in FIG. 19 is an example of display of the destination information acquired from the received information of the e-mail pertaining to the e-mail ID "#1020" in FIG. 5A. For example, the source e-mail address of the e-mail pertaining to the e-mail ID "#1020" is "user3@sample.com", and no specific e-mail address is set in the Reply to field. In addition, no destination information based on the prescribed format is described in the body. In this case, only the source e-mail address "user3@sample.com" is displayed in the destination selection area R20.

Figure 20:
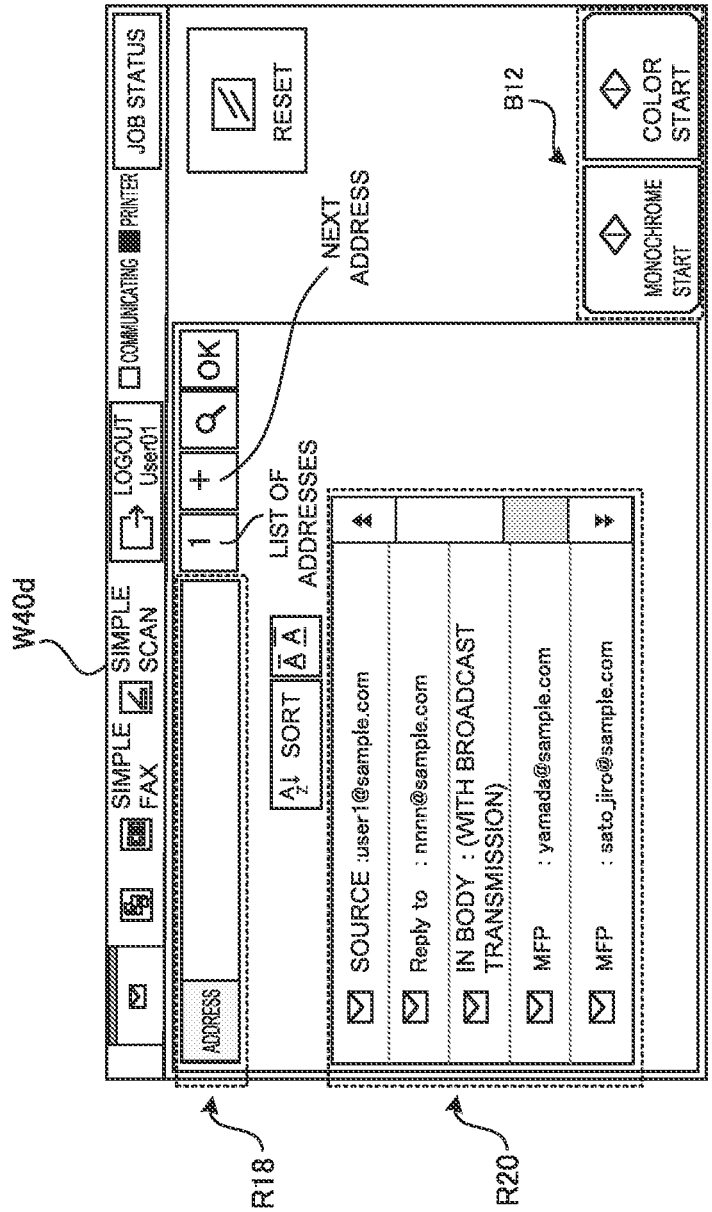
FIG. 20 is a view explaining an operation example according to the first embodiment.

A destination selection screen W40d illustrated in FIG. 20 is another display form of the destination selection screen W40b illustrated in FIG. 18. The destination selection screen W40d can display the registrant information managed by the multifunction peripheral 10 in addition to the e-mail address displayed in the destination selection area R20 illustrated in FIG. 18. In this case, in addition to the destination information acquired from the received e-mail information of the e-mail ID "#1011", the registrant information (for example, the registrant IDs "RI01" and "RI02") managed by the multifunction peripheral 10 is displayed. This allows the user to select the e-mail address to be sent as the job from a larger number of candidate destinations.

As described above, according to the first embodiment, the destination information of the e-mail to be sent as the job pertaining to the Scan to E-mail function is acquired from the received information of the received e-mail, and the acquired e-mail address is displayed on the display. This prevents input errors of the e-mail address and eliminates the hassle of entering the e-mail address.

2. Second Embodiment

A second embodiment can improve security by discarding the destination information acquired from the received e-mail after the execution of a job pertaining to the Scan to E-mail function.

2.1 Functional Structure 2.1.1 Multifunction Peripheral 70

A multifunction peripheral 70 according to the second embodiment can have substantially the same functional structure as the multifunction peripheral 10 according to the first embodiment. Therefore, the same reference signs are given to the constituent components of the multifunction peripheral 70 which are identical to those of the multifunction peripheral 10, and the detailed description thereof will be omitted.

Figure 21:
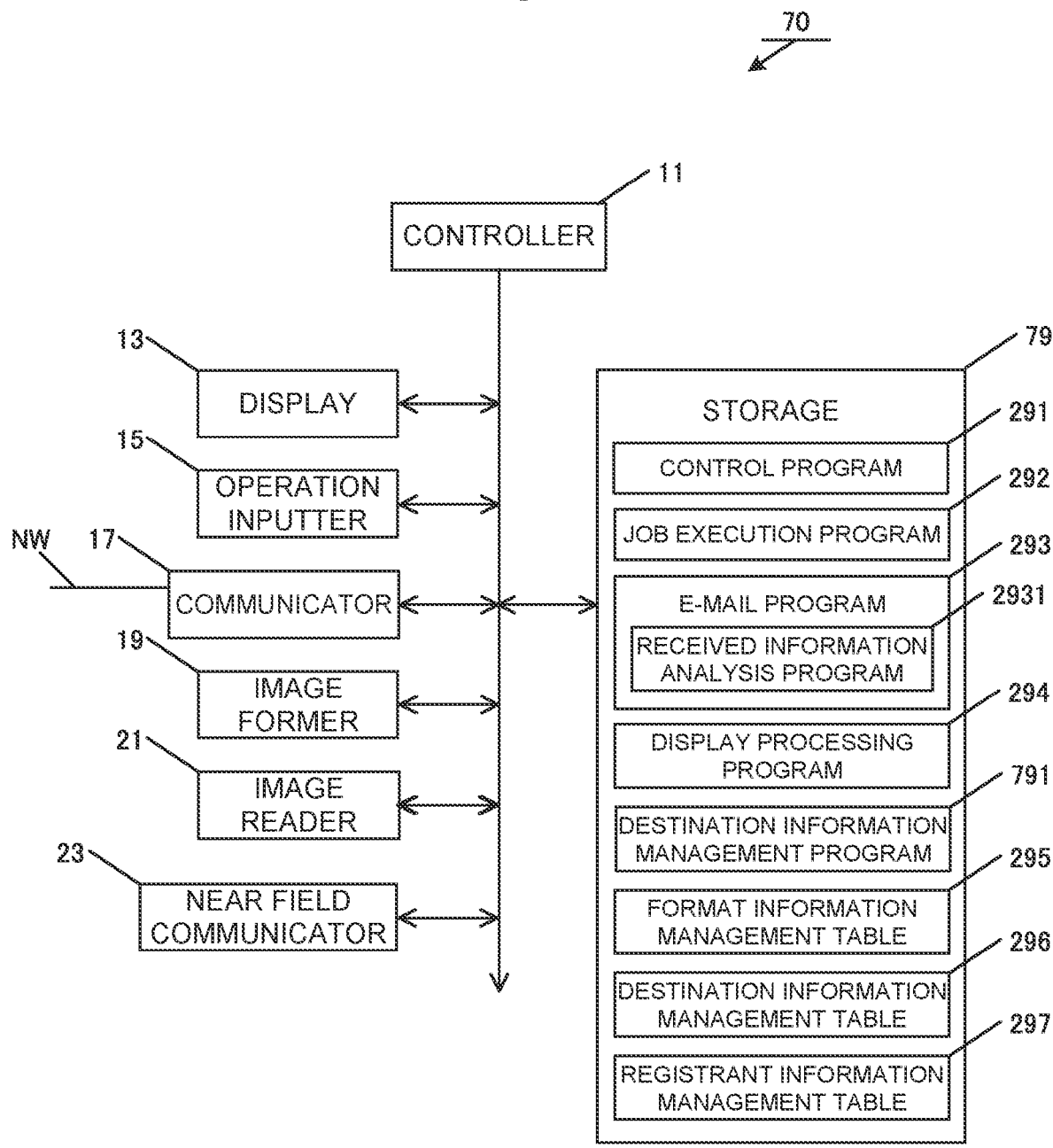
FIG. 21 illustrates a functional structure of a multifunction peripheral according to a second embodiment.

FIG. 21 illustrates a function structure of the multifunction peripheral 70. The multifunction peripheral 70 includes a storage 79 instead of the storage 29 of the multifunction peripheral 10.

In the second embodiment, the storage 79 stores the control program 291, the job execution program 292, the e-mail program 293, the display processing program 294, a destination information management program 791, and reserves the format information management table 295, the destination information management table 296, and the registrant information management table 297.

The destination information management program 791 is a program read by the controller 11 when managing the destination information acquired from received e-mails. The controller 11 that has read the destination information management program 791 monitors the execution of jobs pertaining to the Scan to E-mail function and controls discarding of the acquired destination information from the destination information management table 296 when the job is completed.

2.1.2 Terminal Device 50

The functional structure of the terminal device 50 can be the same as that of the first embodiment, and the description thereof will be omitted.

2.2 Process Flow

The process flow of the multifunction peripheral 70 according to the second embodiment can be similar to the process flow of the multifunction peripheral 10 (steps S10 to S120) described in the flowchart of FIG. 9. In the second embodiment, when executing the job in step S120 of FIG. 9, the acquired destination information may be discarded following notification to the user about the discarding.

The process flow of the terminal device 50 for the second embodiment can be similar to the process of the terminal device 50 described in the flowchart of FIG. 10. Therefore, the description of the processing in the terminal device 50 will be omitted.

2.3 Operation Example

Figure 22:
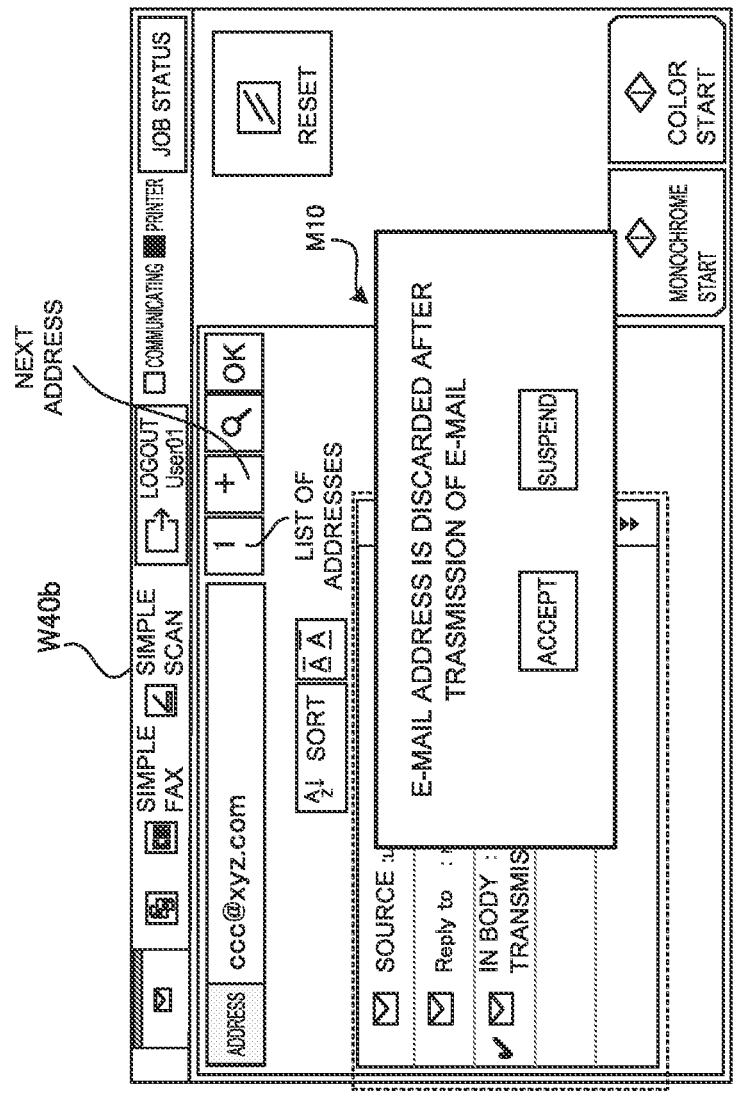
FIG. 22 is a view explaining an operation example according to the second embodiment.

Next, an operation example according to the second embodiment is described by referring to FIG. 22. FIG. 22 illustrates an example structure of a notification screen M10 that notifies the user that the acquired destination information is discarded when the job is executed.

The notification screen M10 illustrated in FIG. 22 can be displayed, for example, at the timing of accepting the selection of the start buttons B12 on the destination selection screen W40b (see FIG. 18). Alternatively, the timing of notification on the notification screen M10 may also be provided at the timing of selecting the e-mail address on the destination selection area R20, or the notification may off course be provided after the execution of the job.

The notification screen M10 illustrated in FIG. 22 indicates that the e-mail address as the destination information is discarded after the execution of the job, that is, after the transmission of the e-mail. The notification screen M10 includes an accept button and a suspend button. The user can select the accept button to accept discarding of the e-mail address in question, or select the suspend button to suspend discarding of the e-mail address in question.

Figure 23:
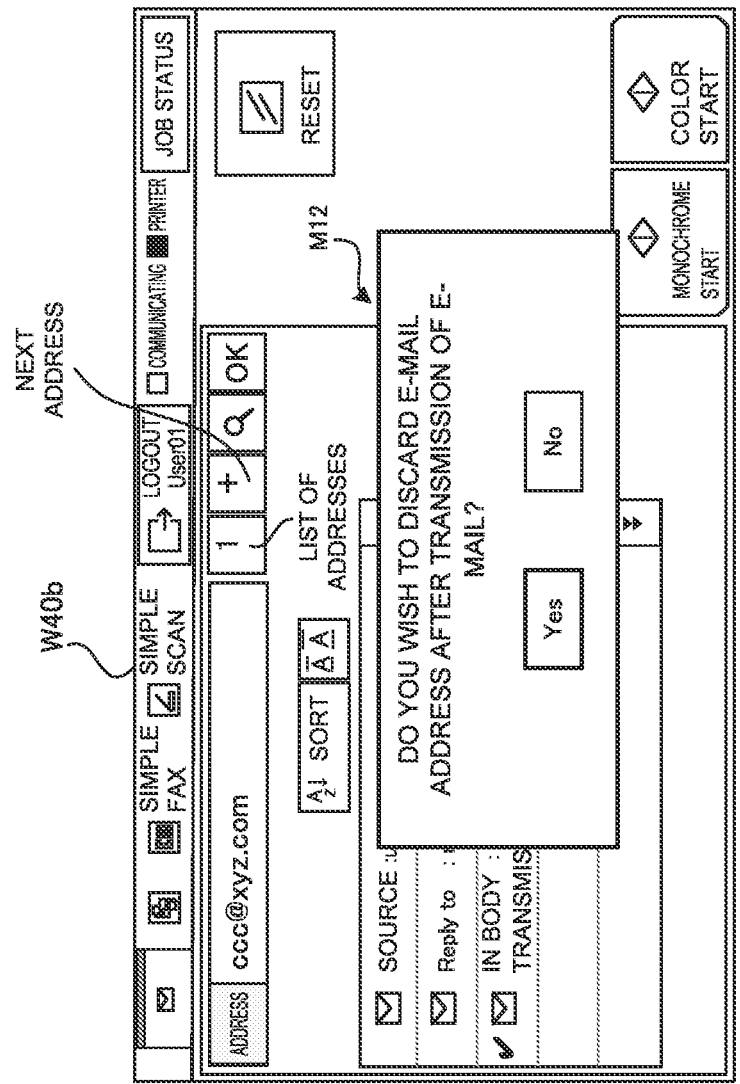
FIG. 23 is a view explaining an operation example according to the second embodiment.

As illustrated in FIG. 23, it is also possible to display a query screen M12 that asks whether the user wants to discard the e-mail address as the destination information after the execution of the job, that is, after the transmission of the e-mail. The user selects the Yes button if the user wants to discard the e-mail address in question, and selects the No button if the user does not want to discard the e-mail address in question.

As described above, the second embodiment can discard the destination information acquired from the received e-mail after execution of the job, in addition to the effect of the first embodiment. This prevents the destination information from being left in the multifunction peripheral and further improves security performance.

3. Third Embodiment

A third embodiment is a form that allows the user to obtain permission to register the destination information acquired from the received e-mail after execution of the job pertaining to the Scan to E-mail function, thus improving the services provided by the multifunction peripheral.

3.1 Functional Structure

The functional structure of a multifunction peripheral and terminal device according to the third embodiment can be substantially the same as those of the multifunction peripheral 70 of the second embodiment and the terminal device 50 of the first embodiment. Therefore, the description of the functional structure according to the third form is omitted.

3.2 Process Flow

The process flow of the multifunction peripheral according to the third embodiment can be similar to the process flow of the multifunction peripheral 70 of the second embodiment. The process flow of the terminal device according to the third embodiment can also be similar to the process flow of the terminal device 50 according to the first embodiment. Therefore, the description of the process flow according to the third embodiment is omitted.

3.3 Operation Example

An operation example of the third embodiment is described by referring to FIG. 24. FIG. 24 illustrates an example structure of a query screen M14 that asks the user for permission to register the acquired destination information when executing the job.

The query screen M14 illustrated in FIG. 24 displays to the user a query asking the user whether to register the e-mail address as the acquired destination information (for example, "Do you register the e-mail address? The registered e-mail address will be used only for the purpose of improving our service . . . "). If the user selects the Yes button, which allows the registration of the e-mail address, the controller 11 registers the e-mail address. If the user selects the No button, which disables the registration of the e-mail address, the controller 11 discards the e-mail address.

Thus, according to the third embodiment, by accumulating e-mail addresses that users have given permission to register, it is possible to transmit, for example, direct mails for sales promotion of products and services to such e-mail addresses. Alternatively, e-mail questionnaires on age groups and purposes of use, and the like can be sent as way of performing market research or to recognize the market trends of competitors, and the like. If the user permission for registration is not obtained, it can also be expected to, for example, generate and provide a certificate or the like to prove the discarding of the e-mail address in question in order to gain the confidence from the user in the handling of the personal information of the user.

The present disclosure is not limited to the embodiments described above, and various modifications can be made. That is, the present disclosure also includes in the technical scope thereof an embodiment to be obtained by combining technical means modified as appropriate without departing from the spirit of the present disclosure.

Although the embodiments described above have been described separately for convenience of explanation, it is indeed possible to combine and implement the embodiments within the technically possible range.

The programs operating in respective devices of the embodiments are the programs that control the CPU or the like (the programs that make the computer function) so as to implement the functions of the above-described embodiments. The information handled by these devices is temporarily stored in the temporary memory (for example, a RAM) during processing, and then stored in various types of read-only memories (a ROM), an HDD, or other storage devices, so that the information can be read, modified, and described as necessary by the CPU.

Here, a recording medium that stores the program may be, for example, any one of a semiconductor medium (for example, a ROM, a non-volatile memory card, or the like), an optical recording medium/magneto-optical recording medium (for example, a digital versatile disc (DVD), a magneto optical disc (MO), a Mini Disc (MD), a compact disc (CD), a Blu-ray (registered trademark) Disc (BD), or the like), and a magnetic recording medium (for example, a magnetic tape, a flexible disc, or the like). The functions of the present disclosure may also be realized not only by executing the loaded programs, but also processing in cooperation with the operating system, other application programs, or the like in accordance with the instructions of the programs.

When the distribution in the market is desired, the programs may be stored in a portable recording medium for distribution or transferred to a server computer connected via a network such as the Internet. In that case, a storage device of the server computer is indeed included in the present disclosure.

What is claimed is:

1. An image processing apparatus, comprising:
a display capable of accepting designation of a destination of an e-mail;
a transmitter/receiver capable of transmitting and receiving the e-mail;
a job executor that executes a job via the e-mail; and
a controller that acquires destination information of the e-mail to be sent as the job from received information of the received e-mail, and displays the acquired destination information on the display, wherein
the controller further makes the destination information of the e-mail received within a predetermined set time period be subject to acceptance of designation as the destination of the e-mail to be sent as the job.

2. The image processing apparatus according to claim 1, wherein
when the received information includes the destination information described in a predetermined format, the controller displays the destination information on the display to allow acceptance of the designation of the destination information as the destination of the e-mail to be sent as the job.

3. The image processing apparatus according to claim 1, wherein
the destination information includes textual information identifying a type of the job.

4. The image processing apparatus according to claim 1, wherein
the destination information includes authentication information for user authentication, and requires a user to enter the authentication information when a job execution instruction is entered.

5. The image processing apparatus according to claim 1, wherein
the controller displays the destination information as well as address information managed by the controller on the display.

6. The image processing apparatus according to claim 1, wherein
the controller stores or discards the acquired destination information when executing the job.

7. A processing system, comprising:
a terminal device that transmits an e-mail including destination information described in a predetermined format; and
an image processing apparatus that includes:
a display capable of accepting designation of a destination of the e-mail;
a transmitter/receiver capable of transmitting and receiving the e-mail;
a job executer that executes a job via the e-mail; and
a controller that acquires the destination information of the e-mail to be sent as the job from the e-mail received from the terminal device, and displays the acquired destination information on the display, wherein
the controller further makes the destination information of the e-mail received within a predetermined set time period be subject to acceptance of designation as the destination of the e-mail to be sent as the job.

8. A processing method, comprising:
designating by accepting a destination of an e-mail;
transmitting/receiving the e-mail;
executing a job via the e-mail;
controlling by acquiring destination information of the e-mail to be sent as the job from received information of the received e-mail, and displaying the acquired destination information on a display; and making the destination information of the e-mail received within a predetermined set time period subject to acceptance of designation as the destination of the e-mail to be sent as the job.

* * * * *